(12) United States Patent
Song et al.

(10) Patent No.: US 12,128,548 B2
(45) Date of Patent: Oct. 29, 2024

(54) SOFT GRIP UNIT, GRIP DEVICE COMPRISING SAME, AND DRIVING METHOD OF GRIP DEVICE

(71) Applicant: KOREA INSTITUTE OF MACHINERY & MATERIALS, Daejeon (KR)

(72) Inventors: Sung Hyuk Song, Daejeon (KR); Sung Hwi Lee, Daejeon (KR); Chanhun Park, Daejeon (KR); Byungin Kim, Sejong (KR); Heechang Park, Daejeon (KR); Dongil Park, Daejeon (KR); Jongwoo Park, Sejong (KR); Jaeyoung Lee, Daejeon (KR); Yongsin Seo, Daejeon (KR); Hyunmok Jung, Sejong (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 805 days.

(21) Appl. No.: 17/294,113

(22) PCT Filed: Jan. 31, 2020

(86) PCT No.: PCT/KR2020/001455
§ 371 (c)(1),
(2) Date: May 14, 2021

(87) PCT Pub. No.: WO2020/251130
PCT Pub. Date: Dec. 17, 2020

(65) Prior Publication Data
US 2021/0402623 A1 Dec. 30, 2021

(30) Foreign Application Priority Data

Jun. 14, 2019 (KR) .................. 10-2019-0070604
Jun. 21, 2019 (KR) .................. 10-2019-0074041

(Continued)

(51) Int. Cl.
*B25J 15/00* (2006.01)
*B25J 15/06* (2006.01)
(Continued)

(52) U.S. Cl.
CPC ....... *B25J 15/0023* (2013.01); *B25J 15/0691* (2013.01); *B25J 15/12* (2013.01); *B25J 19/0025* (2013.01)

(58) Field of Classification Search
CPC .... B25J 15/0023; B25J 15/0691; B25J 15/12; B25J 9/142; B65G 47/908
(Continued)

(56) References Cited

U.S. PATENT DOCUMENTS 3,675,962 A * 7/1972 Simpson .................. B65G 7/12
294/902
4,561,686 A * 12/1985 Atchley ................ B66C 1/0231
294/188

(Continued)

FOREIGN PATENT DOCUMENTS

CN 206795867 U 12/2017
DE 102016115102 A1 * 2/2018 ............ B25J 13/081

(Continued)

OTHER PUBLICATIONS

Extended European Search Report issued on Jun. 20, 2022, in connection with European Patent Application No. 20821747.1.
(Continued)

*Primary Examiner* — Dean J Kramer
(74) *Attorney, Agent, or Firm* — Hauptman Ham, LLP

(57) ABSTRACT

In a soft grip unit, a grip device having the soft grip unit, and a driving method of the grip device, the soft grip unit includes a flexible cover, a particle, a negative pressure generator and a flexible supporting part. The flexible cover has a gripping surface on which a target object is attached and a reference surface coupled with the gripping surface. The particle is received by the receiving space, and transformed corresponding to a shape of the target object. The negative pressure generator is connected to the flexible (Continued)

cover. The negative pressure generator absorbs an air of the receiving space to contract the flexible cover. The flexible supporting part is tightly attached to the reference surface, and transformed at the same time when the flexible cover is pressurized and transformed by the target object.

19 Claims, 20 Drawing Sheets

(30) Foreign Application Priority Data

Jun. 28, 2019 (KR) .......................... 10-2019-0077880
Jan. 16, 2020 (KR) .......................... 10-2020-0005811

(51) Int. Cl.
  *B25J 15/12* (2006.01)
  *B25J 19/00* (2006.01)
(58) Field of Classification Search
  USPC ................................ 294/86.4, 183, 185, 188
  See application file for complete search history.

(56) References Cited

U.S. PATENT DOCUMENTS

| | | | |
|---|---|---|---|
| 5,833,291 A | 11/1998 | Haugs | |
| 8,240,729 B2* | 8/2012 | Vittor | ...................... B25J 15/02 |
| | | | 294/902 |
| 9,457,477 B1 | 10/2016 | Rublee et al. | |
| 2014/0103673 A1* | 4/2014 | Nammoto | ................ B25J 11/00 |
| | | | 264/259 |
| 2015/0272749 A1* | 10/2015 | Amend, Jr. | ............. A61F 2/588 |
| | | | 623/64 |
| 2019/0030728 A1 | 1/2019 | Nagata et al. | |
| 2019/0061170 A1* | 2/2019 | Curhan | ................ B25J 15/0616 |

FOREIGN PATENT DOCUMENTS

| | | |
|---|---|---|
| JP | H9-38883 A | 2/1997 |
| JP | 2003-142556 A | 5/2003 |
| JP | 2006-334687 A | 12/2006 |
| JP | 2009-190775 A | 8/2009 |
| JP | 2013-184251 A | 9/2013 |
| JP | 2014-61584 A | 4/2014 |
| JP | 2014-76524 A | 5/2014 |
| JP | 2014-200853 A | 10/2014 |
| JP | 2015-100844 A | 6/2015 |
| JP | 2017-56510 A | 3/2017 |
| KR | 10-2012-0126576 A | 11/2012 |
| KR | 10-2020-0096897 A | 8/2020 |
| KR | 10-2152467 B1 | 9/2020 |

OTHER PUBLICATIONS

International Search Report issued May 12, 2020, corresponding to International Application No. PCT/KR2020/001455.
Chinese Office Action issued on Jan. 26, 2024, in connection with the Chinese Patent Application No. 202080008837.4, with its English translation, 13 pages.

* cited by examiner (a)

(b)

SOFT GRIP UNIT, GRIP DEVICE COMPRISING SAME, AND DRIVING METHOD OF GRIP DEVICE

CROSS-REFERENCE TO RELATED APPLICATION

This present application is a national stage filing under 35 U.S.C § 371 of PCT application number PCT/KR2020/001455 filed on Jan. 31, 2020 which is based upon and claims the benefit of priority to Korean Patent Application Nos. 10-2019-0070604 filed Jun. 14, 2019, 10-2019-0074041 filed Jun. 21, 2019, 10-2019-0077880 filed Jun. 28, 2019 and 10-2020-0005811 filed Jan. 16, 2020 in the Korean Intellectual Property Office. The disclosures of the above-listed applications are hereby incorporated by reference herein in their entireties.

BACKGROUND

1. Field of Disclosure

The present disclosure of invention relates to a soft grip unit, a grip device having the soft grip unit, and a driving method of the grip device, and more specifically the present invention relates to a soft grip unit, a grip device having the soft grip unit, and a driving method of the grip device, capable of gripping an object more stably.

2. Description of Related Technology

Generally, a collaborative robot is a manufacturing robot strengthening a safety function and collaborating with human being in the same working space.

The collaborative robot may be rearranged, and thus production flexibility may be increased compared to the conventional industrial robot. Thus, the collaborative robot has been developed as a robot having a single arm, a robot having dual arms and so on.

However, even though an automation for a picking for multi-kind products and freights is urgent due to increasing demands for distribution automation, a motor driven gripper having a robot hand copying the hand of human being is a mostly manufactured product as the conventional collaborative robot. Here, to perform the operation of the hand of human being, the elements such as actuators, rotating links and so on should be equipped for each finger, and the controller for each element is necessary, so that the structure of the gripper may be complicated and the integrated control system for the gripper may be also complicated.

In addition, the conventional gripper is hard to grip the object having various kinds of shapes and materials. That is, in the conventional gripper, each robot may grip a predetermined shape of object, and thus various kinds of robots are necessary for gripping various kinds of objects and the controller should be re-set up for every object.

Accordingly, the technology for stably gripping the objects having various kinds of shapes and materials, for example an atypical object, a flexible object and so on, and the technology for stably maintaining the gripping force may be necessary.

Related prior art is Korean laid-open patent No. 10-2012-0126576 (Nov. 21, 2012).

SUMMARY

The present invention is developed to solve the above-mentioned problems of the related arts. The present invention provides a soft grip unit, a grip device having the soft grip unit, and a driving method of the grip device, capable of gripping an object more stably.

The technical purposes of the present invention may not limited thereto, and various changes and modifications may be made by one ordinary skilled in the art within the spirit and scope of the present invention.

According to an example embodiment, the soft grip unit includes a flexible cover, a particle, a negative pressure generator and a flexible supporting part. The flexible cover has a gripping surface on which a target object is attached and a reference surface coupled with the gripping surface, to form a receiving space inside of the flexible cover. The particle is received by the receiving space, and transformed corresponding to a shape of the target object. The negative pressure generator is connected to the flexible cover. The negative pressure generator absorbs an air of the receiving space to contract the flexible cover so that the particle transformed corresponding to the shape of the target object is pressurized so as for the target object to be gripped by the flexible cover. The flexible supporting part is tightly attached to the reference surface, and transformed at the same time when the flexible cover is pressurized and transformed by the target object, to support the flexible cover.

In an example, the soft grip unit may further include a flexible pocket received in the receiving space, having a pore having the size smaller than the particle, and receiving the particle inside of the flexible pocket.

In an example, the flexible pocket may have a plurality of dividing parts, and the particle may be uniformly distributed and received by each of the dividing parts.

In an example, the negative pressure generator may have a suction line extending into an inside of the receiving space and inhaling the air of the receiving space. An end of the suction line may be connected to the flexile pocket.

In an example, the soft grip unit may further include a signal generator generating a transform completing signal when the flexible cover is transformed to reach a predetermined compression distance.

In an example, the signal generator may includes a pressing block disposed inside of a through hole formed at the flexible supporting part, and a flexible electrode formed at a surface of the flexible supporting part and generating the transform completing signal when the flexible cover is transformed to reach the predetermined compression distance.

In an example, the pressing block may be spaced apart from the flexible electrode at an initial state when the flexible supporting part is not compressed and transformed.

According to another example embodiment, a soft grip unit includes a first stiffness transform, a flexible supporting part and a second stiffness transform. The first stiffness transform has a first flexible cover and a first particle received in the first flexible cover. After the first stiffness transform is transformed by an external force, stiffness of the first stiffness transform is changed as a fluid inside of the first flexible cover is removed, and the stiffness along a first direction is larger than that along a direction different from the first direction. The flexible supporting part is tightly attached to a surface of the first stiffness transform, and is compressed and transformed at the same time as the first stiffness transform is transformed to support the first stiffness transform. The second stiffness transform is disposed adjacent to the first stiffness transform. After the second stiffness transform is transformed by the external force, the stiffness of the second stiffness transform is changed as the fluid inside thereof is removed, and a stiffness along a second direction crossing the first direction is larger than that along a direction different from the first direction so that the first stiffness transform is prevented from being moved or transformed additionally along the second direction.

In an example, the first stiffness transform may have a first flexible pocket disposed inside of the first flexible cover and receiving the first particle. The first flexible pocket may have a plurality of first dividing parts which is divided by a seam and receives the first particle uniformly, and a stitch of the seam may be sewed by a zigzag pattern along the first direction so as for the first flexible pocket to elongate and contract along the first direction.

In an example, the second stiffness transform may have a second flexible cover disposed opposite to the first stiffness transform and a second particle received inside of the second flexible cover. The stiffness of the second stiffness transform may be changed as a fluid of the second flexible cover is removed, and a stiffness along the second direction may be larger than that along a direction different from the second direction.

In an example, the second stiffness transform may have a second flexible pocket disposed inside of the second flexible cover and receiving the second particle. The second flexible pocket may have a plurality of second dividing parts which is divided by a seam and receives the second particle uniformly, and a stitch of the seam may be sewed by a zigzag pattern along the second direction so as for the second flexible pocket to expand and contract along the second direction.

In an example, an install space may be formed in the flexible supporting part along a height direction. The second stiffness transform may have a third flexible cover disposed in the install space and a third particle received inside of the third flexible cover. The second stiffness transform may support the flexible supporting part to prevent the flexible supporting part from being transformed, when the second stiffness transform is transformed with the first stiffness transform and the transformation of the first stiffness transform is completed.

In an example, an install space may be formed in the flexible supporting part along a height direction. The second stiffness transform may have a wrinkle part disposed in the install space and an elastic part disposed inside of the wrinkle part. The wrinkle part may be compressed and transformed as the first stiffness transform is transformed. The elastic part may elongate the compressed and transformed winkle part. The second stiffness transform may further have a valve. The valve may remove a fluid inside of the wrinkle part when the wrinkle part is compressed and transformed and prevent the fluid from being flowed into the wrinkle part when the compression and the transformation of the wrinkle part is completed.

In an example, the second stiffness transform may have a fourth flexible cover covering a side surface of the flexible supporting part, and a fourth particle received inside of the fourth flexible cover. The second stiffness transform may constrain the flexible supporting part to prevent the flexible supporting part from being transformed when the second stiffness transform is transformed with the first stiffness transform and the transformation of the first stiffness transform is completed.

In an example, the flexible supporting part may have a honeycomb structure having a plurality of pores and a plurality of sidewalls respectively dividing the pores with substantially same thickness. Each of the pores may pass through the flexible supporting part along a height direction, and a shape and a cross-sectional area of each of the pores may be substantially same.

In an example, the soft grip unit may further include a packing cover receiving the first stiffness transform, the flexible supporting part and the second stiffness transform.

According to still another example embodiment, a grip device includes an arm, a power supplier and a controller. The arm has at least one pair. The soft grip unit is combined with the arm, and the arm operates the soft grip unit to reach the target object or to be far away from the target object. The power supplier is configured to supply a power to the arm. The controller is configured to control the arm to change a stiffness of the soft grip unit for gripping the target object when the soft grip unit is transformed by the target object.

In an example, the grip device may further include a holding unit configured to be operated between at least one pair of soft grip units, and holding the target object to be positioned between the pair of soft grip units.

In an example, the holding unit may have a suction pad and the suction pad may have a plurality of suction cells respectively forming an inner space divided by a sidewall. The sidewall may block an air flow. A suction power may be provided into the inner space of each of the suction cells to grip the target object.

In an example, the holding unit may have a porous flexible supporting material filled in the inner space of each of the suction cells.

According to the present example embodiments, the flexible cover is supported by the flexible supporting part and an amount of the particles is reduced by forming the thickness of the flexible cover thinner, so that the pressing force on the object may be applied more effectively. Thus, the object may be easily gripped with a decreased force, and the fragile object may be gripped more easily without the damage to the object.

In addition, the transformed shape is fixed due to the gripping using the particle, so that the gripping may be stably and continuously maintained even though the object is flexible or has an atypical shape. In addition, the shape of the object or the strength for the object may not be limited.

In addition, the signal generator generates the transform completing signal when the flexible cover is transformed to reach the predetermined compression distance, and the gripping operation may be stopped when the signal is generated, so that the object may be prevented from being damaged due to an additional unnecessary gripping force.

In addition, the second stiffness transform is added to the first stiffness transform, to prevent the first stiffness transform from being additionally transformed or moved along the second direction. Here, the first stiffness transform has relatively larger stiffness along the first direction compared to the stiffness along other directions, and the second stiffness transform has relatively larger stiffness along the second direction compared to the stiffness along other direction. Thus, the object may be stably and continuously gripped.

In addition, the object may be moved by the holding unit, so as for the soft grip unit to grip the object, so that the gripping may be automatically performed for the object regardless of the position of the object.

Here, the holding unit is divided into the plurality of spaces with the plurality of suction cells, so that the space between the suction cells is decreased and the entire suction area is increased, to enhance the efficiency of the suction.

Further, when the suction cell contacting with the object is transformed by the pressure of the shape of the object, a portion of the suction cell pressed by the object is mostly contacted with the surface of the object and thus the contact area between the suction cell and the object may be increased. Thus, the suction force applied to the object may be increased. In addition, due to the porous flexible supporting material filled in the suction cell, each suction cell provides the suction force to the object more efficiently.

DETAILED DESCRIPTION

Figure 1:
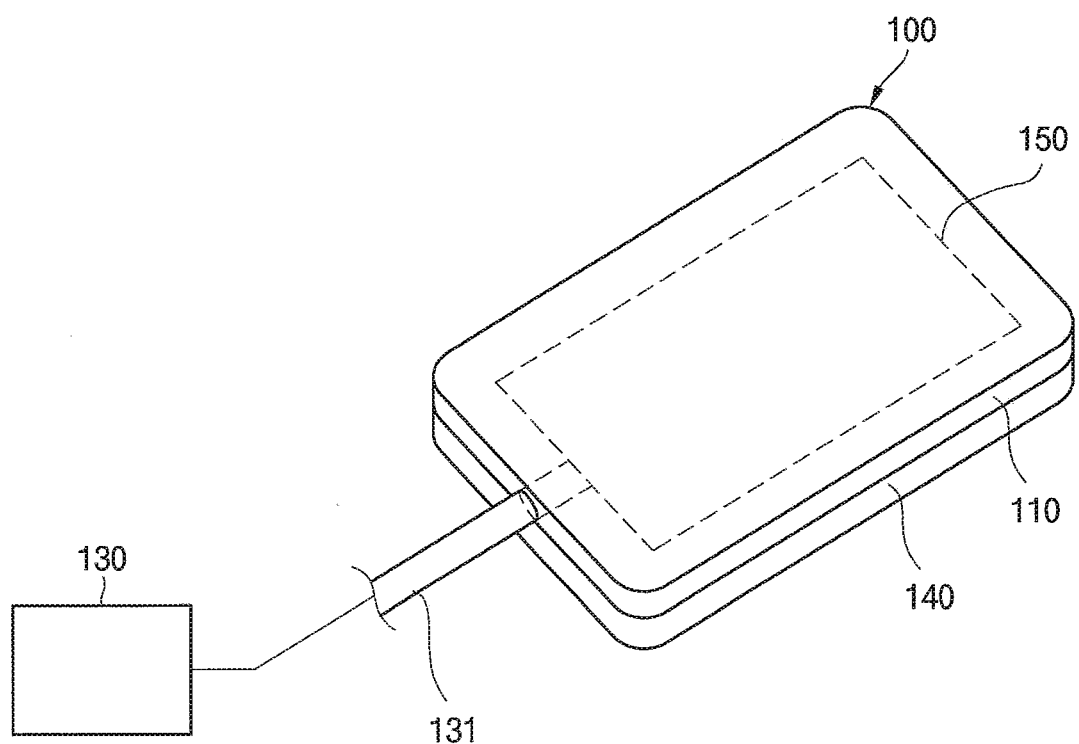
FIG. 1 is a perspective view illustrating a soft grip unit according to an example embodiment of the present invention.

The invention is described more fully hereinafter with Reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. Spatially relative terms, such as "beneath," "below," "lower," "above," "upper" and the like, may be used herein for ease of description to describe one element or feature's relationship to another element(s) or feature(s) as illustrated in the figures.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The invention is described more fully hereinafter with reference to the accompanying drawings, in which embodiments of the invention are shown.

Figure 2:
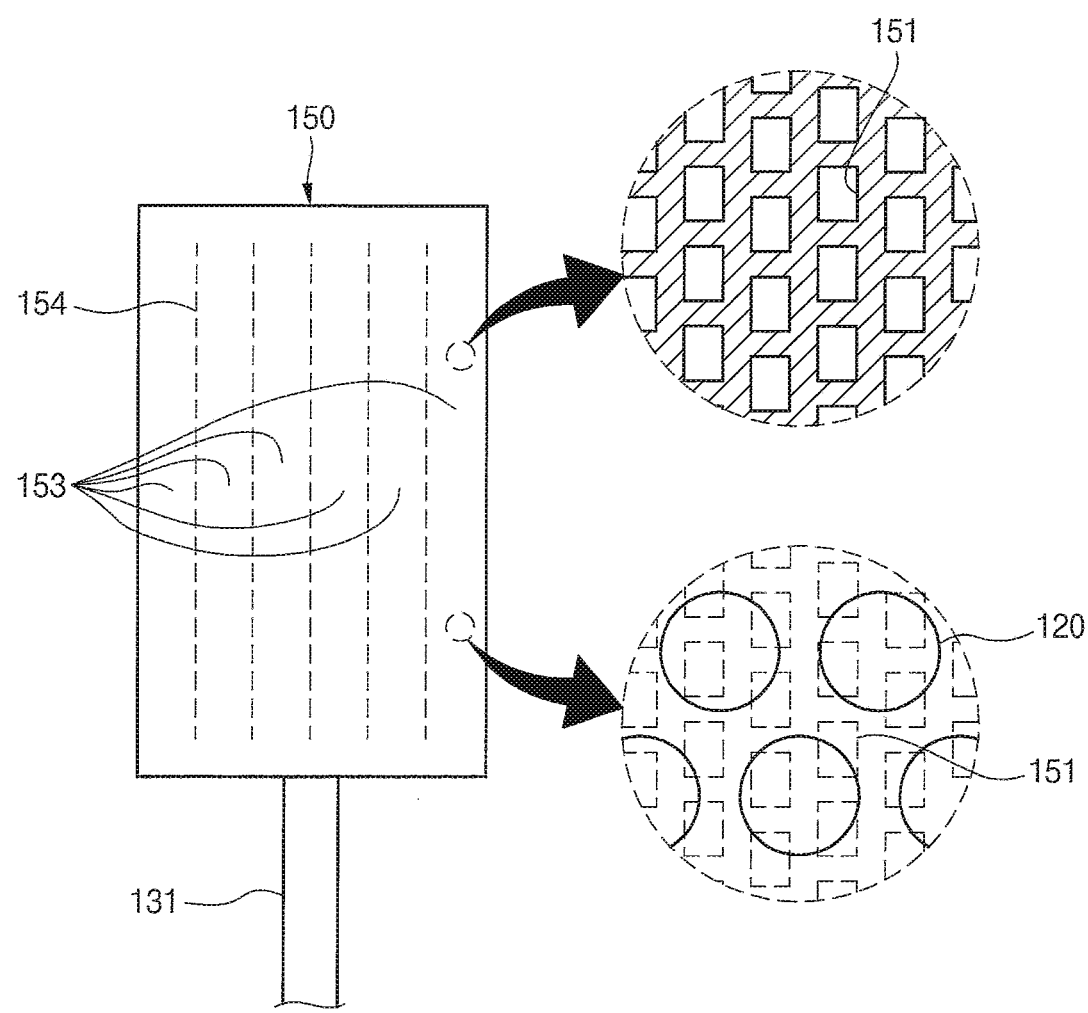
FIG. 2 is a plan view and an enlarged view illustrating a flexible pocket of the soft grip unit of FIG. 1.
Figure 3:
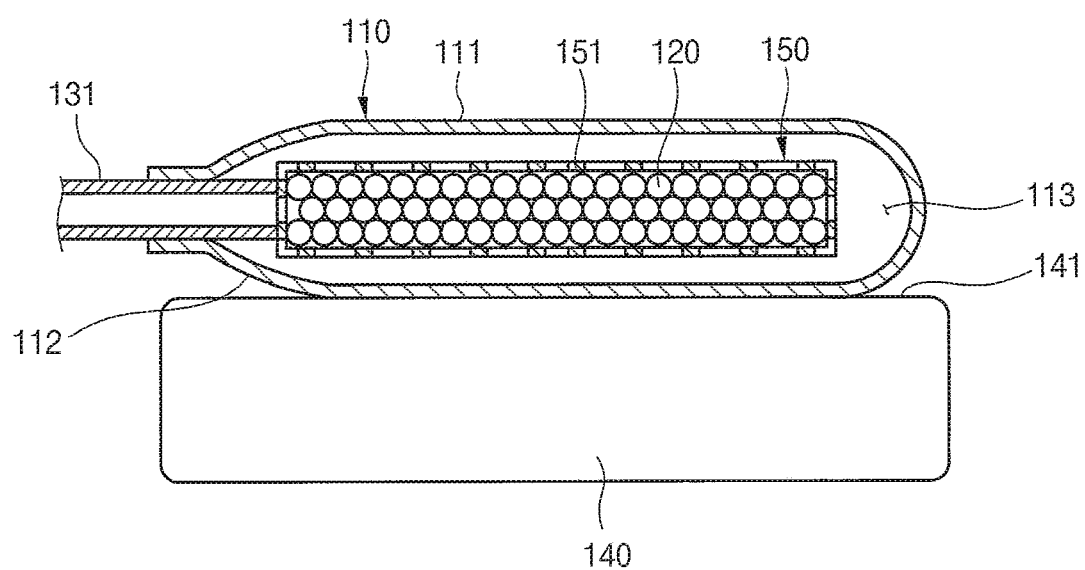
FIG. 3 is a cross-sectional view of the soft grip unit of FIG. 1.

FIG. 1 is a perspective view illustrating a soft grip unit according to an example embodiment of the present invention. FIG. 2 is a plan view and an enlarged view illustrating a flexible pocket of the soft grip unit of FIG. 1. FIG. 3 is a cross-sectional view of the soft grip unit of FIG. 1.

Referring to FIG. 1, FIG. 2 and FIG. 3, the soft grip unit 100 according to the present example embodiment includes a flexible cover 110, a particle 120, a negative pressure generator 130 and a flexible supporting part 140.

The flexible cover 110 has a gripping surface 111 and a reference surface 112. The gripping surface 111 forms a first side of the flexible cover 110 and a target object is attached to the gripping surface 111. The reference surface 112 is coupled with the gripping surface 111 and forms a second side of the flexible cover 110. A receiving space 113 is formed inside between the gripping surface 111 and the reference surface 112.

Here, the target object is an arbitrary object which is gripped by the soft grip unit 100.

The flexible cover 110 may have relatively thin layer with flexibility, and an air may be blocked.

The particle 120 is filled inside of the receiving space 113. Here, a lot of particles 120 may be filled inside of the receiving space 113, and the size of each of the particles is not limited and thus the particle 120 may also be a powder.

When the target object is attached to the flexible cover 110, the particle 120 may be transformed corresponding to the shape of the target object attached to the flexible cover 110. Here, the transformation of the particle 120 means that the shape of each of the particles 120 is changed due to the compression force of the target object and an entire arrangement or an entire disposition of the particles 120 is changed due to the compression force thereof, too.

The negative pressure generator 130 is connected to the flexible cover 110. The negative pressure generator 130 has a suction line 131, and the suction line 131 is extended into the receiving space 113. The negative pressure generator 130 inhales to remove an air inside of the receiving space 113 through the suction line 131.

As the air inside of the receiving space 113 is inhaled by the negative pressure generator 130, the flexible cover 110 may be contracted. In addition, as the air of the receiving space 113 is removed to contract the flexible cover 110, the particle 120 is compressed and tightly fixed.

Here, when the negative pressure generator 130 inhales the air of the receiving space 113 with the target object attached by the gripping surface 111, the particle 120 is tightly compressed as the flexible cover 110 contracts, and then the particle 120 and the flexible cover 110 are tightly hardened and fixed. Here, the transformed particle 120 is tightly hardened and fixed with a transformed shape corresponding to the shape of the target object, and then, the target object attached to the gripping surface 111 may be gripped by the flexible cover 110.

The flexible supporting part 140 may be tightly attached to the flexible cover 110. For example, a supporting surface 141 of the flexible supporting part 140 may be tightly attached to the reference surface 112 of the flexible cover 110.

The target object is attached to the gripping surface 111 of the flexible cover 110, and then the flexible supporting part 140 may be transformed at the same time with the transformation of the flexible cover 110 and the particle 120. In addition, the flexible supporting part 140 may support the flexible cover 110. Here, the flexible supporting part 140 may include a polymer.

A frame (not shown) may be further disposed under the flexible cover 110 to support the flexible cover 110.

The soft grip unit 100 may further include a flexible pocket 150.

The flexible pocket 150 is received by the receiving space 113, and has a pore 151. Here, the pore 151 may be a plural. The particle 120 is received inside of the flexible pocket 150. Here, when the flexible pocket 150 is additionally included, the particle 120 may be received by the flexible pocket 150 and then the flexible pocket 150 having the particle 120 may be received by the receiving space 113.

A size of the pore 151 may be smaller than that of the particle 120, and thus the particle 120 is not leaked through the pore 151.

The flexible pocket 150 may have a mesh shape.

The flexible pocket 150 may have a plurality of dividing parts 153, and the dividing parts 153 may be divided with each other by a seam 154.

The particle 120 is uniformly received by each of the dividing parts 153, and thus the particle 120 is uniformly distributed over the flexible pocket 150.

A first end of the suction line 131 disposed inside of the flexible cover 110 is connected to the flexible pocket 150, and thus the suction force generated by the negative pressure generator 130 is directly provided to the flexible pocket 150 via the suction line 131.

The flexible pocket 150 may include a flexible material such as a textile. As the suction force from the negative pressure generator 130 is provided to the flexible pocket 150, the air inside of the flexible pocket 150 is removed into the suction line 131 via the pore 151, and the air inside of the receiving space 113 is removed into the flexible pocket 150 via the pore 151 and then is removed into the suction line 131.

Accordingly, as the air of the receiving space 113 is removed by the suction line 131, the particles 120 are compressed with each other. Here, since the particles 120 are uniformly distributed in each dividing part 153, the particles 120 may be prevented from being lumped during the compression of the particles 120 and may be distributed uniformly over the entire flexible pocket 150.

Hereinafter, example operations of the soft grip unit are explained referring to FIG. 4A and FIG. 4B.

Figure 4A:
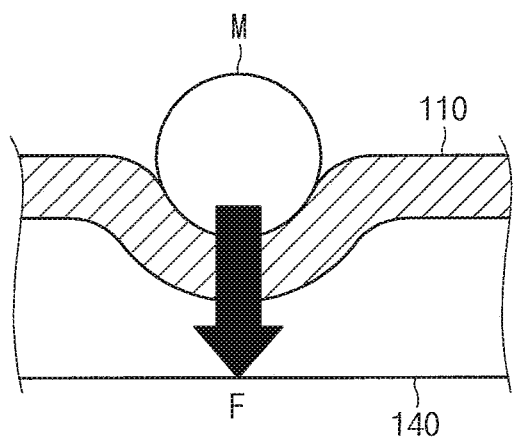
FIG. 4A and FIG. 4B are schematic views illustrating operations of the soft grip unit of FIG. 1.
Figure 4B:
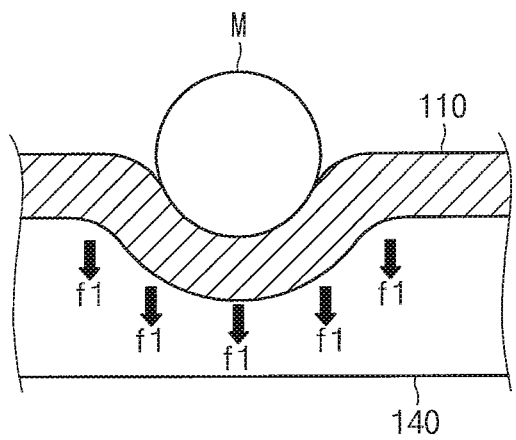

FIG. 4A and FIG. 4B are schematic views illustrating operations of the soft grip unit of FIG. 1. FIG. 4A shows a state before providing the suction force to the receiving space 113, and FIG. 4B shows a state after providing the suction force to the receiving space 113.

As illustrated in FIG. 4A, at an initial state before the suction force is not provided to the receiving space 113, when the target object M is pressed by the gripping surface 111, the pressing force F pressurizes the particle 120 and the particle 120 is transformed corresponding to the shape of the target object M. At the same time, the shape of the flexible cover 110 and the shape of the flexible pocket 150 are respectively changed corresponding to the shape of the target object M, and the flexible supporting part 140 is also pressurized to be transformed.

Here, the pressing force F applied by the target object M is localized at a portion pressurized by the target object M. Likewise, when the pressing force applied by the target object M is localized or focused, the transformation of the particle 120 may be maximized, and the particle 120 may be transformed corresponding to the shape of the target object M more effectively.

Then, as illustrated in FIG. 4B, when the suction force is provided into the flexible cover 110 and then the particle 120 is fixed, the pressing force by the target object M is distributed or scattered all over the flexible cover 110, the flexible pocket 150 and the flexible supporting part 140.

Here, the sum of distributed forces f1 applied to the flexible cover 110, the flexible pocket 150 and the flexible supporting part 140 is substantially same as the pressing force F in FIG. 4A. Thus, even though the additional pressing force is applied after gripping the target object M, the additional pressing force is distributed and the force applied to a specific local portion is very small, so that the transformation of the particle 120 may be minimized by the additional pressing force. Thus, the particle 120 once transformed corresponding to the shape of the target object M may be stably and continuously maintained, and the gripping for the target object M may be stably and continuously maintained.

Hereinafter, example effects of the soft grip unit are explained referring to FIG. 5A and FIG. 5B.

Figure 5A:
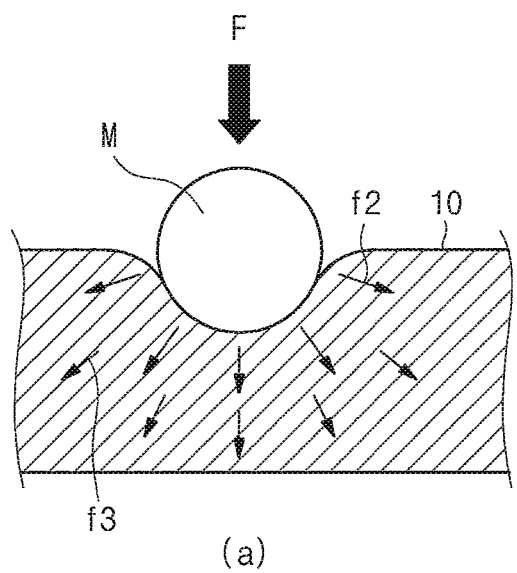
FIG. 5A and FIG. 5B are schematic view illustrating effects of the soft grip unit of FIG. 1.
Figure 5B:
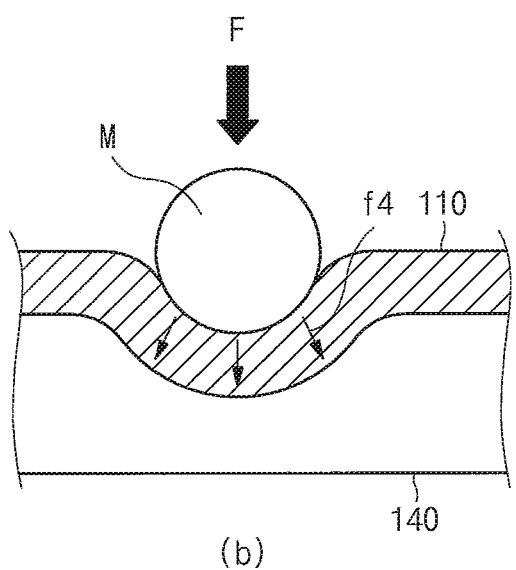

FIG. 5A and FIG. 5B are schematic view illustrating effects of the soft grip unit of FIG. 1. The flexible cover 10 of FIG. 5A is only formed with a height substantially same as the total height of the flexible cover 110 and the flexible supporting part 140 in FIG. 5B.

Referring to FIG. 5A, as the thickness of the flexible cover 10 increases, the amount of the particles received in the flexible cover 10 increases. Thus, a relatively increased force is necessary to transform the particle 120.

A force applied to the target object M is distributed to a force f2 transforming a particle relatively close to the target object M from the flexible cover 10 and a force f3 transforming a particle relatively far away from the target object M form the flexible cover 10. Thus, the force f2 applied close to the target object M is not enough to transform the target object M, so that the particle relatively close to the target object M may not be effectively transformed. That is, since the particle 120 relatively close to the target object M is not transformed well corresponding to the shape of the target object M, the gripping force for the target object M may be limited or may not be sufficient even though the particle 120 is hardened via the suction force.

In contrast, referring to FIG. 5B, as in the present example embodiment, the thickness of the flexible cover 110 is formed to be relatively thinner to decrease the amount of the particles and the flexible supporting part 140 is disposed to support the flexible cover 110, so that the pressing force F applied to the particle 120 from the target object M may be transmitted more efficiently. Thus, when the substantially same pressing force F is applied in each example of FIG. 5A and FIG. 5B, the transformation of the particle 120 may be larger in the example of FIG. 5B, so that the attaching area of the particle 120 on the target object M may be increased and the gripping force may be more increased.

Accordingly, the target object M may be efficiently gripped using the relatively smaller force, and since the relatively smaller is applied, the relatively weak or fragile object may be easily gripped without or minimizing the damage of the object.

The flexible supporting part 140 supports the flexible cover 110 to assist the transformation of the flexible cover 110 more efficiently.

Figure 6:
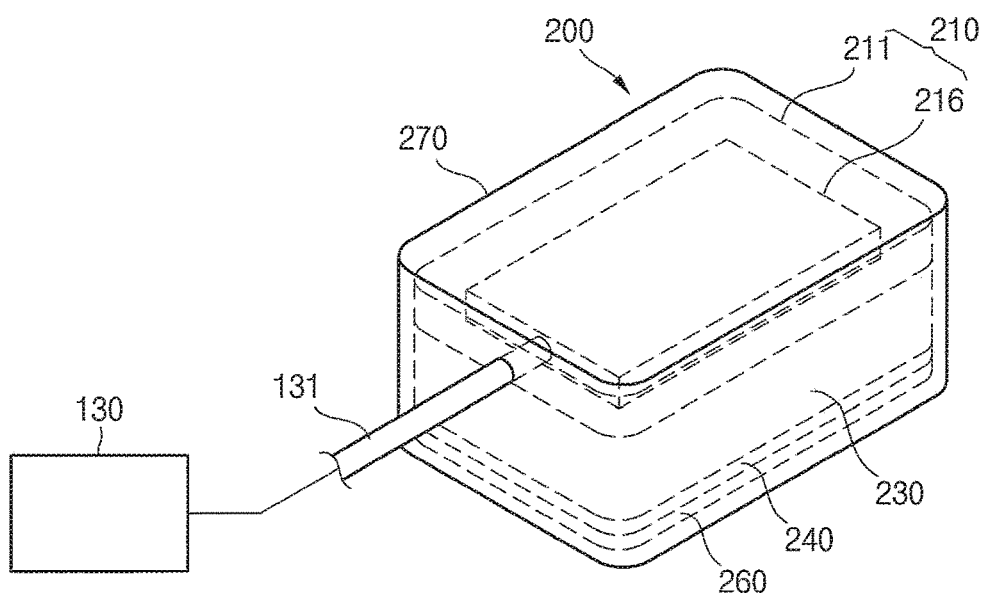
FIG. 6 is a perspective view illustrating a soft grip unit according to another example embodiment of the present invention.
Figure 7:
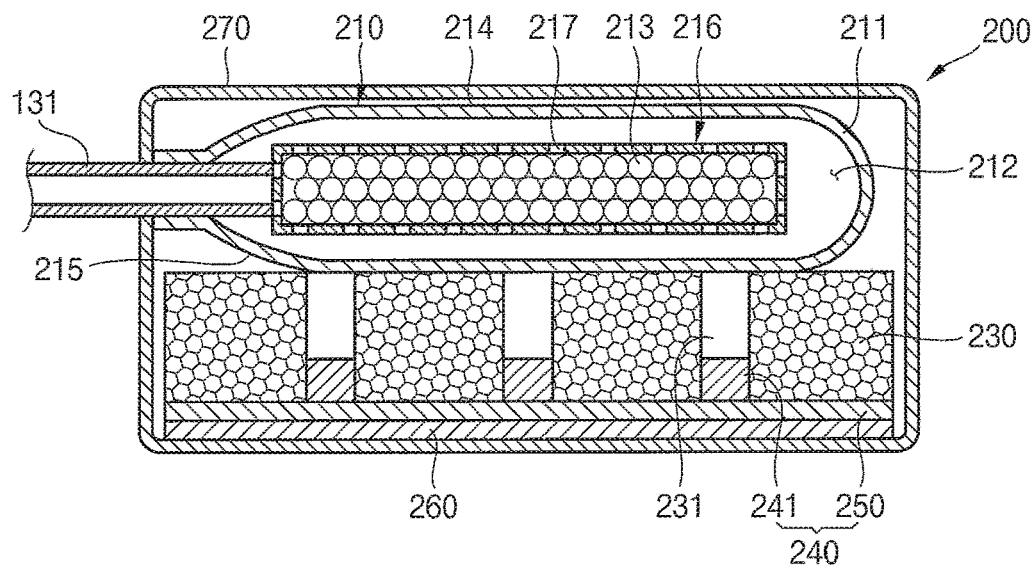
FIG. 7 is a cross-sectional view of the soft grip unit of FIG. 6.

FIG. 6 is a perspective view illustrating a soft grip unit according to another example embodiment of the present invention. FIG. 7 is a cross-sectional view of the soft grip unit of FIG. 6.

Referring to FIG. 6 and FIG. 7, the soft grip unit 200 according to the present example embodiment includes a grip part 210, a negative pressure generator 130, a first flexible supporting part 230 and a signal generator 240. The grip 210 may include a flexible cover 211 and a particle 213.

The flexible cover 211 has a receiving space 212 inside thereof, and has a thin film or layer shape having a flexibility. Here, the flexible cover 211 prevents the air from being penetrated.

The particle 213 is received in the receiving space 212, and the particle 213 may be a material forming a powder and may be sand, but not limited thereto.

As the target object is attached or pressed on a first surface 214 of the flexible cover 211, the particle 213 is pressurized and is transformed to be a shape corresponding to the target object.

The negative pressure generator 130 absorbs the air in the receiving space 212 to contract the flexible cover 211, with the flexible cover 211 and the particle 213 are transformed. As the flexible cover 211 contracts, the particle 213 is pressurized. As the particle 213 is pressurized to be fixed, the shape of the flexible cover 211 is also fixed so that the grip part 210 grips the target object.

For example, the negative pressure generator 130 is connected to the flexible cover 211 through the suction line 131. The suction line 131 extends inside of the receiving space 212, and the negative pressure generator 130 absorbs the air inside of the receiving space 212 through the suction line 131.

As the air in the receiving space 212 is absorbed by the negative pressure generator 130, the flexible cover 211 contracts. Here, as the air is out from the receiving space 212 and the flexible cover 211 contracts, the particle 213 is pressurized and fixed more tightly.

The grip part 210 may further include a flexible pocket 216. The flexible pocket 216 is received by the receiving space 212 and the particle 213 is received in the flexible pocket 216. Here, the suction line 131 is connected to the flexible pocket 216.

The flexible pocket 216 includes a flexible material, and has a mesh shape. The flexible pocket 216 has pore 217 having a size smaller than that of the particle. Thus, when the air is out from the flexible pocket 216 to the suction line 131, the air inside of the receiving space 212 passes through the pore 217 to be inside of the flexible pocket 216 and then is out to the suction line 131.

A surface of the first flexible supporting part 230 is attached to a second surface 215 of the flexible cover 211. The first supporting part 230 is compressed and transformed to support the grip part 210 at the same time with the transformation of the grip part 210. The first flexible supporting part 230 may include a polymer material, and may include a honeycomb structure.

The first flexible supporting part 230 has a through hole 231 passing through the first flexible supporting part 230 along a height direction. A first end of the through hole 231 is open toward the second surface 215 of the flexible cover 211, and a second end of the through hole 231 is open toward a flexible electrode 250. The through hole 231 may be a plural, and the plurality of the through holes 231 may be uniformly arranged. Here, the number or the arrangement of the through holes 231 may be variously changed.

The signal generator 240 generates a signal when the grip part 210 is transformed to reach a predetermined compression distance. The signal generator 240 has a pressing block 241 and a flexible electrode 250.

The pressing block 241 is disposed inside of the first flexible supporting part 230. For example, the pressing block 241 may be disposed inside of the second end of the through hole 231. As the grip part 210 is pressurized and transformed by the target object M, the first flexible supporting part 230 is compressed and transformed, and as the grip part 210 reaches the predetermined compression distance, the pressing block 241 is pressurized and pushed by the grip part 210.

The pressing block 241 is spaced apart from an inner surface of the through hole 231, and a lower portion of the pressing part 241 is fixed to the inner surface of the through hole. Thus, before the grip part 210 reaches the predetermined compression distance, the pressing block 241 is not interacted with the through hole 231. As the first flexible supporting part 230 is compressed by the first flexible supporting part 230, the first flexible supporting part 230 is transformed along the height direction. Thus, before the grip part 210 pressurizes the pressing block 241, the pressing block 241 may be pressed or pushed by the inner surface of the through hole 231. In addition, the above-mentioned pressing or pushing may be caused as the length of the pressing block 241 increases. Thus, in the present example embodiment, since the lower portion of the pressing block 241 is fixed in the inner surface of the through hole 231 and other portions of the pressing block 241 is not fixed and is spaced apart from the inner surface of the through hole 231, the pressing block 241 is not pressed and pushed until the grip part 210 starts to contact the pressing block 241 as the first flexible supporting part 230 uniformly transforms along the height direction.

The flexible electrode 250 is disposed beneath the first flexible supporting part 230. The flexible electrode 250 is electrically connected by the pressing of the pressing block 241 when the grip part 210 is transformed to reach the predetermined compression distance.

In FIG. 7, a second flexible supporting part 260 is additionally disposed under the flexible electrode 250, and the second flexible supporting part 260 may include an elastic material so that the second flexible supporting part 260 may also be compressed or pressurized in the portion of the pressed flexible electrode 250. The operation of the second flexible supporting part 260 is explained below referring to FIG. 8A and FIG. 8B.

Figure 8A:
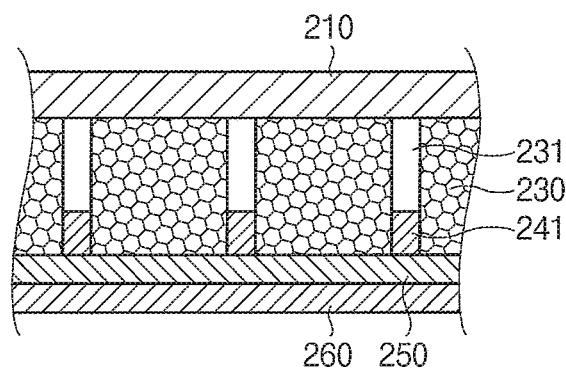
FIG. 8A and FIG. 8B are schematic views illustrating operations of the soft grip unit of FIG. 6.
Figure 8B:
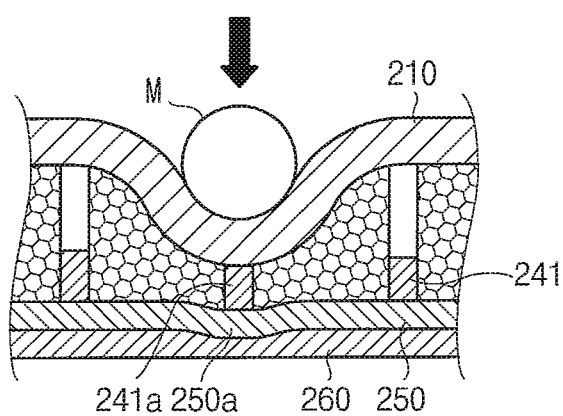

FIG. 8A and FIG. 8B are schematic views illustrating operations of the soft grip unit of FIG. 6.

Referring to FIG. 8A, at the initial state in which the flexible electrode 250 is not pressurized by the pressing block 241, the second flexible supporting part 260 is not transformed. Then, referring to FIG. 8B, when the grip part 210 and the flexible supporting part 230 are transformed by the target object M and the pressing block 241a is pressurized by the grip part 210, a portion 250a of the flexible electrode 250 pressurized by the pressing block 241a also pressurizes the second flexible supporting part 260. Here, the second flexible supporting part 260 may have an elastic material, and as the flexible electrode 250 is restored into the initial shape, the second flexible supporting part 260 may also be restored into the initial shape.

When the flexible electrode 250 is electrically connected, the negative pressure generator 130 is operated to fix or harden the grip part 210. Here, there exists a time interval between the time when the flexible electrode 250 is electrically connected and the time when the grip is hardened. Here, if the second flexible supporting part 260 is replaced by a hard supporting part, the pressing block 241 blocks the transformation of the grip part 210 and thus a reaction force is applied to the target object M by the pressing block 241. Thus, the relatively weak or fragile target object M may be damaged. However, as in the present example embodiment, the second flexible supporting part 260 is equipped, so that the second flexible supporting part 260 may be additionally compressed to move the pressing block 241 additionally during the time interval. Thus, the reaction force by the pressing block 241 may not be applied to the target object M.

In addition, since the pressing block 241 is disposed inside of the through hole 231 and specifically, is disposed inside of the lower portion of the through hole 231, physical interaction between the pressing block 241 and the flexible supporting part 230 may be minimized during the compression of the flexible supporting part 230.

In the initial state when the flexible supporting part 230 is not compressed and transformed, the pressing block 241 is spaced apart from the flexible electrode 250.

Figure 9:
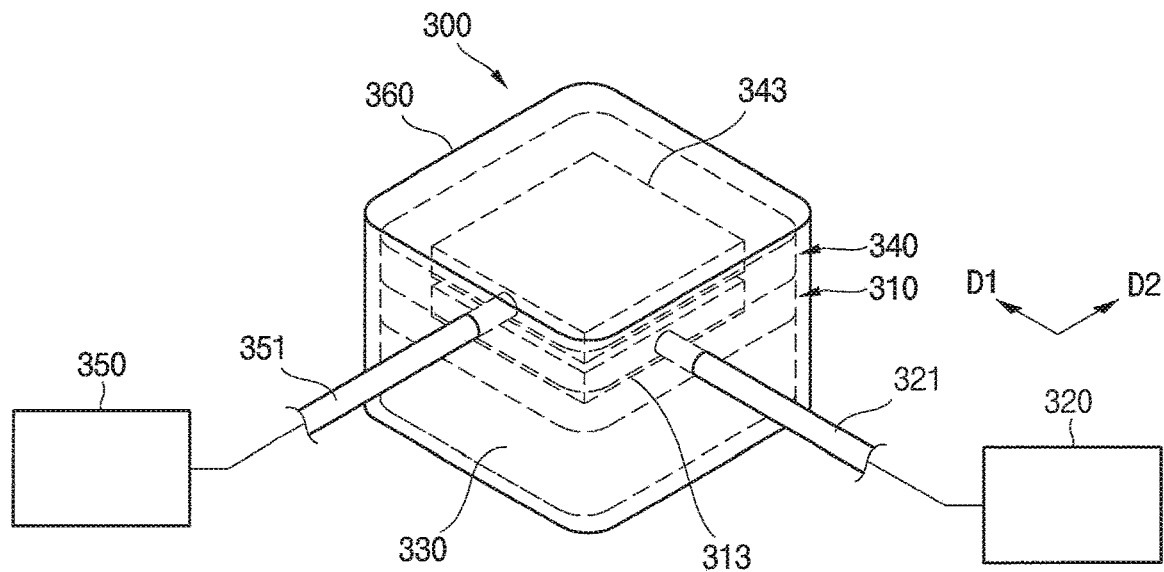
FIG. 9 is a perspective view illustrating a soft grip unit according to still another example embodiment of the present invention.
Figure 10:
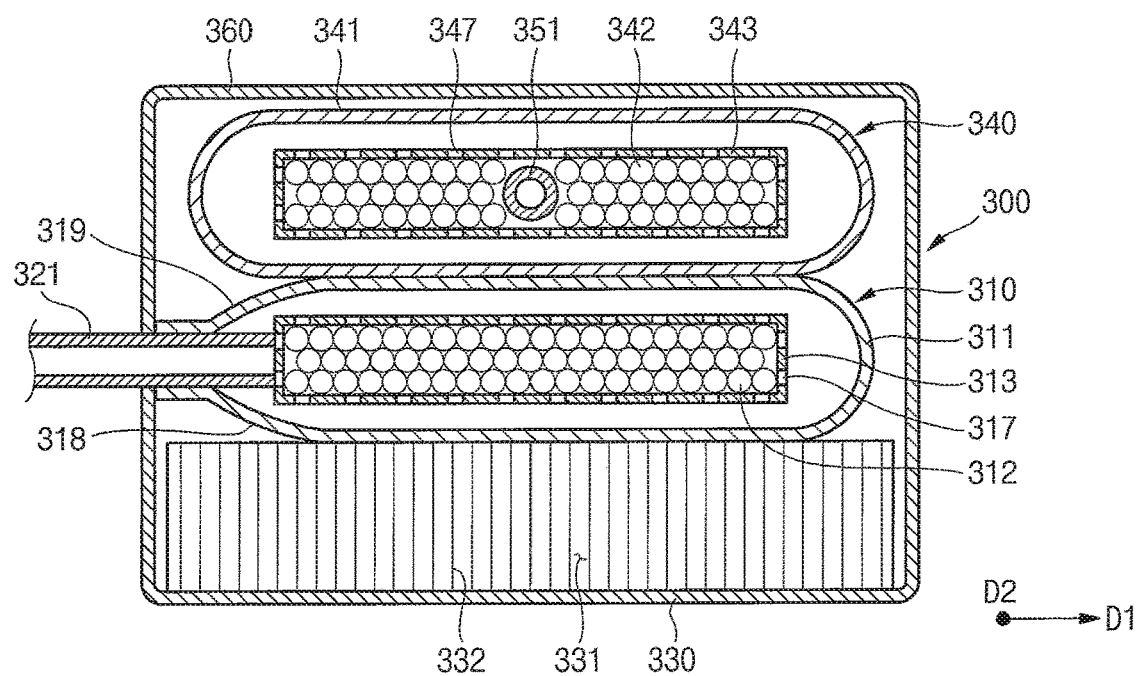
FIG. 10 is a cross-sectional view of the soft grip unit of FIG. 9.

FIG. 9 is a perspective view illustrating a soft grip unit according to still another example embodiment of the present invention. FIG. 10 is a cross-sectional view of the soft grip unit of FIG. 9.

Referring to FIG. 9 and FIG. 10, the soft grip unit 300 according to the present example embodiment includes a first stiffness transform 310, a flexible supporting part 330 and a second stiffness transform 340.

The first stiffness transform 310 includes a first flexible cover 311 and a first particle 312.

The first flexible cover 311 has a pocket shape having a space inside thereof, and has a flexible thin layer. The first flexible cover 311 prevents the air from being penetrated.

The first particle 312 is received in and filled with the first flexible cover 311. The first particle 312 may include a material forming a powder and may be sand, but not limited thereto.

When the target object is pressurized by the first flexible cover 311, the first particle 312 is transformed to be a shape corresponding to the shape of the target object. Here, the transformation of the particle 312 means that the particles moves and each shape of the particles or the entire distribution or shape of the particles are changed.

The soft grip unit 300 has a first negative pressure generator 320. The first negative pressure generator 320 is connected to the first flexible cover 311 via the first suction line 321, and the first suction line 321 extends inside of the first flexible cover 311.

The first negative pressure generator 320 absorbs the air inside of the first flexible cover 311 to contract the first flexible cover 311, with the state of being transformed by the first flexible cover 311 and the first particle 312. As the first flexible cover 311 contracts, the first particle 312 is compressed. As the first particle 312 is compressed and fixed, the stiffness of the first stiffness transform 310 increases and thus the target object may be gripped.

The first stiffness transform 310 is disposed inside of the first flexible cover 311, and has a first flexible pocket 313 receiving the first particle 312.

Figure 11:
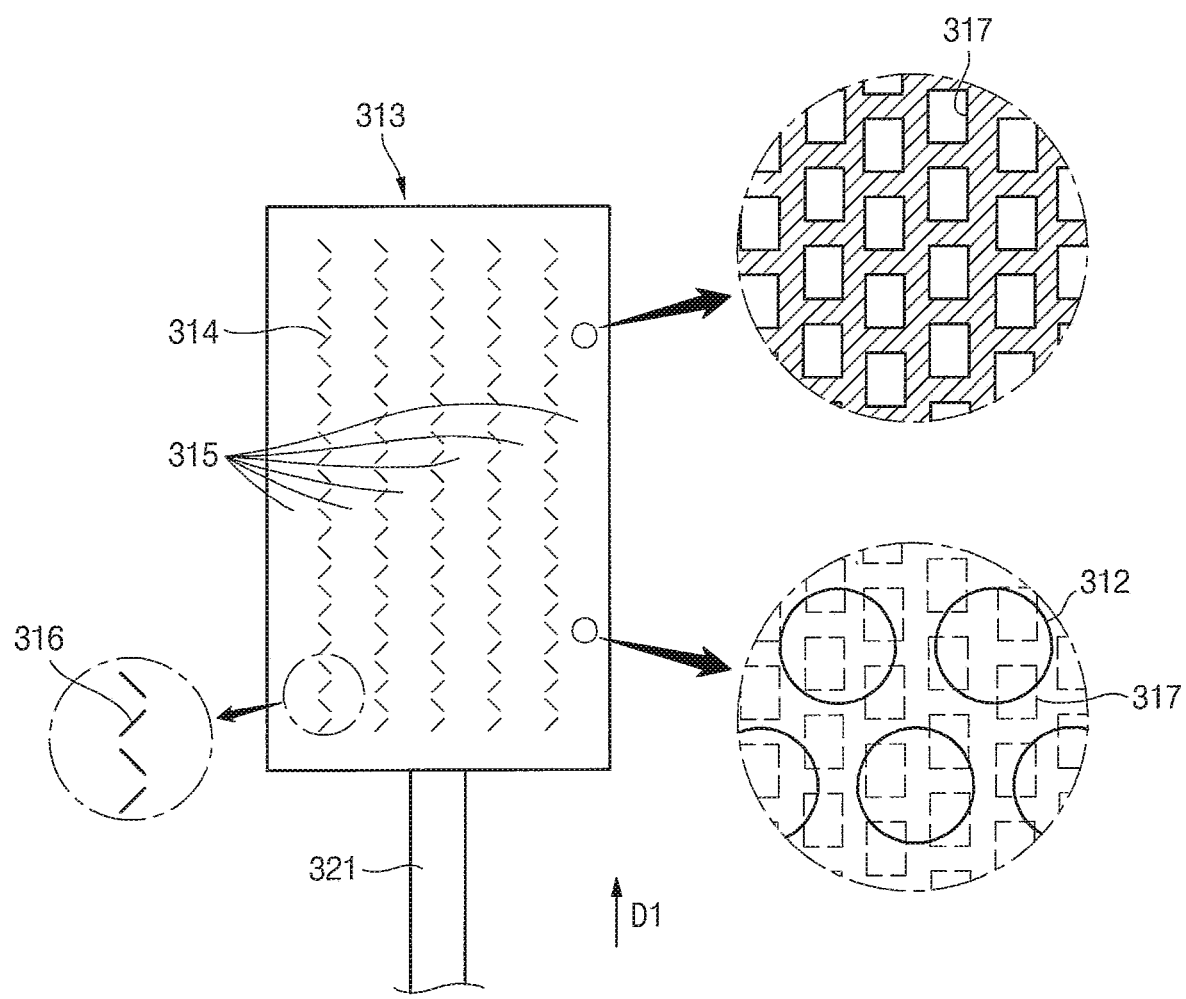
FIG. 11 is a plan view and an enlarged view illustrating a first flexible pocket of the soft grip unit of FIG. 9.

FIG. 11 is a plan view and an enlarged view illustrating a first flexible pocket of the soft grip unit of FIG. 9.

Referring to FIG. 9, FIG. 10 and FIG. 11, the first flexible pocket 313 receives the first particle 312 inside thereof, and the first suction line 321 is connected to the first flexible pocket 313.

The first flexible pocket 313 has a flexible material, and has a mesh shape. The first flexible pocket 313 has a pore 317 having a size smaller than that of the first particle 312.

The size of the pore 317 is smaller than that of the first particle 312, so that the first particle 312 received in the first flexible pocket 313 is not leaked through the pore 317.

As the air of the first flexible pocket 313 is absorbed by the first suction line 321, the air inside of the first flexible cover 311 is also moved into the first flexible pocket 313 via the pore 317 and then is absorbed by the first suction line 321.

The first flexible pocket 313 has a plurality of first dividing parts 315 which is uniformly divided by a seam 314. The first particle 312 may be uniformly distributed by the first dividing parts 315 and be uniformly received by the first flexible pocket 313.

A stitch 316 of the seam 314 may be formed to be a zigzag shape along a first direction D1. When the stitch 316 is formed to be a straight line along the first direction D1, the flexible pocket is hard to be extended along the first direction D1. Thus, the flexible pocket is not flexibly transformed and the gripping force may be decreased, even though the target object pressurizes the flexible pocket.

However, as in the present example embodiment, the stitch 316 of the seam 314 extends with the zigzag shape along the first direction D1, so that the first flexible pocket 313 may be elongated and contracted along the first direction D1 and the shape of the first flexible pocket 313 may be flexibly transformed.

In addition, since the first dividing part 315 extends along the first direction D1, when the first particles 312 are tightly attached with each other due to the removal of the air or fluid inside of the first flexible cover 311, the stiffness of the first stiffness transform 310 along the first direction D1 is larger than that along a direction different from the first direction D1.

The flexible supporting part 330 is tightly attached to a first surface 318 of the first stiffness transform 310. The flexible supporting part 330 supports the first stiffness transform 310 with compressed at the same time when the first stiffness transform 310 is transformed. The flexible supporting part 330 may include a polymer material and have a pore, and thus the flexible supporting part 330 may be restored into an initial shape when the external force compressing the flexible supporting part 330 is removed.

The second stiffness transform 340 is disposed adjacent to the first stiffness transform 310. The second stiffness transform 340 is transformed by the external force, and the stiffness of the second stiffness transform 340 is changed as the fluid or air inside of the second stiffness transform 340 is removed. Here, the stiffness of the second stiffness transform 340 along a second direction D2 may be larger than that along a direction different from the second direction D2. The second direction D2 may cross the first direction D1.

The second stiffness transform 340 has the shape substantially same as that of the first stiffness transform 310, and is disposed on a second surface 319 of the first stiffness transform 310.

The second stiffness transform 340 includes a second flexible cover 341 and a second particle 342. The second flexible cover 341 and the second particle 342 may be respectively substantially same as the first flexible cover 311 and the first particle 312.

The soft grip unit 300 includes a second negative pressure generator 350 and a second flexible pocket 343. The second negative pressure generator 350 is connected to the second flexible pocket 343 inside of the second flexible cover 341 via the second suction 351. The second flexible pocket 343 may include a pore 347.

The first negative pressure generator 320 and the second negative pressure generator 350 are individually equipped, but not limited thereto. For example, the first negative pressure generator 320 and the second negative pressure generator 350 may be formed integrally, and here as the negative pressure generator operates, the first and second stiffness transforms 310 and 340 may be transformed at the same time.

Since the second stiffness transform 340 overlaps with the first stiffness transform 310, so that the second stiffness transform 340 may be pressurized and transformed at the same time with the first stiffness transform 310. In addition, as the air inside of the second flexible cover 341 is removed by the second negative pressure generator 350, the stiffness of the second stiffness transform 340 may be changed.

The second flexible pocket 343 is also divided by the seam, and thus the second flexible pocket 343 may also include a plurality of dividing parts (not shown) in which the second particle 342 is uniformly distributed and received. Here, the stitch of the seam may also be formed to have the zigzag shape.

In the second stiffness transform 340, the seam (not shown) of the second flexible pocket 343 may extend along the second direction D2. Thus, the second stiffness transform 340 may be elongated and contracted along the second direction D2. The size of the transformation of the second stiffness transform 340 may be substantially same as that of the first stiffness transform 310.

In the first stiffness transform 310, the first dividing part 315 extends along the first direction D1, so that the stiffness along the first direction D1 is largest among that along other directions different from the first direction D1. Thus, after the first stiffness transform 310 is transformed and fixed, the first stiffness transform 310 may be transformed along the other directions different from the first direction D1. However, in the present example embodiment, in the second stiffness transform 340, the second dividing part extends along the second direction D2, the stiffness along the second direction D2 is increased to prevent the first stiffness transform 310 from being additionally transformed along the second direction D2. That means that the second stiffness transform 340 are also prevented from being transformed along the first direction D1 additionally. Accordingly, the transformed and fixed state in gripping the target object may be uniformly and continuously maintained.

Figure 12A:
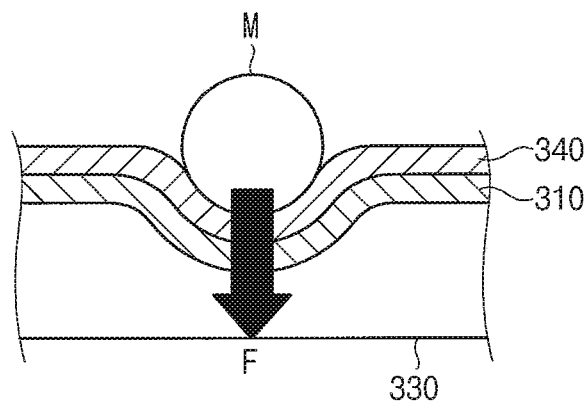
FIG. 12A and FIG. 12B are schematic views illustrating operations of the soft grip unit of FIG. 9, and FIG. 12C and FIG. 12D are schematic view illustrating effects of the soft grip unit of FIG. 9.
Figure 12B:
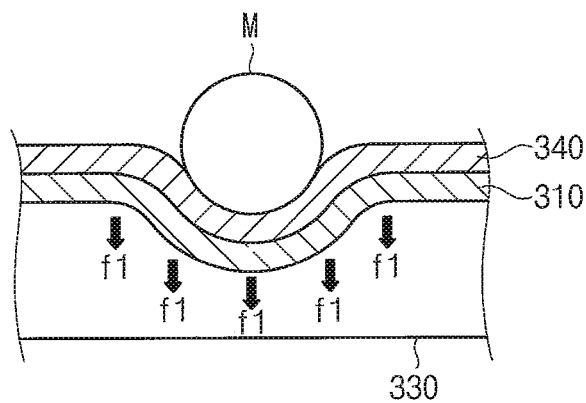
Figure 12C:
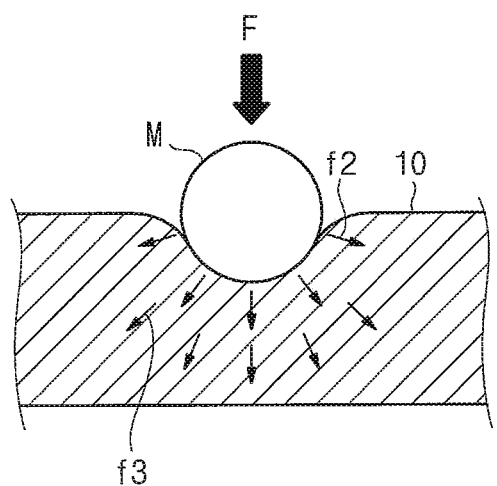
Figure 12D:
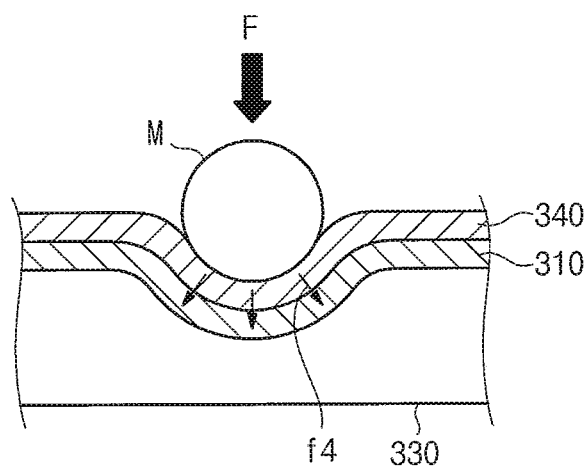

FIG. 12A and FIG. 12B are schematic views illustrating operations of the soft grip unit of FIG. 9, and FIG. 12C and FIG. 12D are schematic view illustrating effects of the soft grip unit of FIG. 9.

FIG. 12A shows a state before the stiffness of the first stiffness transform 310 and the stiffness of the second stiffness transform 340 are not changed. FIG. 12B shows a state after the stiffness of the first stiffness transform 310 and the stiffness of the second stiffness transform 340 are changed.

Referring to FIG. 12A, at the initial state before the stiffness of the first stiffness transform 310 and the stiffness of the second stiffness transform 340 are not changed, when the target object M is pressurized by the second stiffness transform 340, the first and second stiffness transforms 310 and 340 are transformed to have a shape corresponding to the target object M by the pressing force F. At the same time, the flexible supporting part 330 is also pressurized to be transformed.

Here, the pressing force F is localized to a portion of the target object M directly making contact with the second stiffness transform 340. Thus, when the pressing force F is localized and focused at the portion, the first particle 312 and the second particle 342 are transformed maximally and the first particle 312 and the second particle 342 are efficiently transformed corresponding to the target object M.

Then, referring to FIG. 12B, as the suction force is applied inside of the first and second stiffness transforms 310 and 340 and then the first and second particles 312 and 342 are fixed, the pressing force for the target object M is distributed over the first stiffness transform 310, the second stiffness transform 340 and the flexible supporting part 330.

In addition, the sum of the distributed forces f1 applied to the first stiffness transform 310, the second stiffness transform 340 and the flexible supporting part 330 is substantially same as the pressing force F in FIG. 12A. Thus, even though the pressing force is additionally applied after gripping the target object M, the additional pressing force is uniformly distributed with a relatively smaller force, so that the first and second particles 312 and 342 may be prevented from being additionally transformed, or may be minimized to be additionally transformed. Accordingly, the first and second particles 312 and 342 transformed corresponding to the shape of the target object M may be stably and continuously maintained and the gripping for the target object M may be stably and continuously maintained.

In FIG. 12C, a single stiffness transform 10 is formed to have a height substantially same as the total height of the first stiffness transform 310, the second stiffness transform 340 and the flexible supporting part 330 of FIG. 12D.

Referring to FIG. 12C, as the thickness of the stiffness transform 10 increases, the amount of the particles received in the stiffness transform 10 also increases, and thus the force for transforming the particles should be increased.

The force applied to the target object M is distributed to a force f2 transforming a particle relatively close to the target object M from the stiffness transform 10 and a force f3 transforming a particle relatively far away from the target object M form the stiffness transform 10. Thus, the force f2 applied close to the target object M is not enough to transform the target object M, so that the particle relatively close to the target object M may not be effectively transformed. That is, since the particle relatively close to the target object M is not transformed well corresponding to the shape of the target object M, the gripping force for the target object M may be limited or may not be sufficient even though the particle 120 is hardened via the suction force.

That is, to grip the target object M using the stiffness transform 10 effectively, the particles relatively close to the target object M should be transformed effectively. The force f2 applied to the portion close to the target object M is necessary to be large enough to grip the target object M, but if the force f2 is increased to grip the target object M more effectively, the target object M may be damaged in gripping.

In contrast, as illustrated in FIG. 12D, the thickness of the first stiffness transform 310 and the thickness of the second stiffness transform 340 are decreased to decrease the amount of the particles and the flexible supporting part 330 is equipped to support the first and second stiffness transforms 310 and 340. Thus, the pressing force F1 from the target object M may be efficiently distributed to the first and second particles 312 and 342 in the first and second stiffness transforms 310 and 340. Accordingly, when the pressing force F is applied by the target object M, the first and second particles 312 and 342 may be transformed more effectively, to increase a contacting area with the target object M and to enhance the gripping force for the target object M.

Accordingly, in the present example embodiment, the target object M may be efficiently gripped using the relatively smaller force, and since the relatively smaller is applied, the relatively weak or fragile object may be easily gripped without or minimizing the damage of the object. In addition, the stiffness along the first direction D1 and the stiffness along the second direction D2 are substantially same with each other, and thus the first and second stiffness transforms 310 and 340 are prevented from being additionally transformed and the target object M may be stably and continuously gripped.

Figure 13:
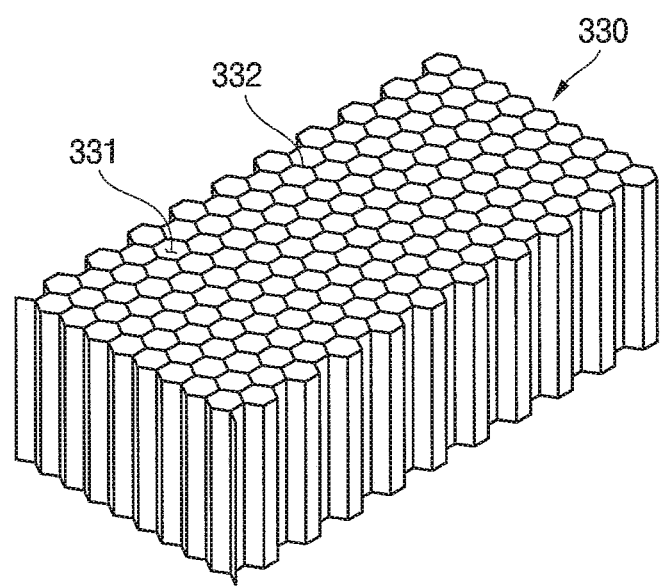
FIG. 13 is a perspective view illustrating a flexible supporting part of FIG. 9.
Figure 14A:
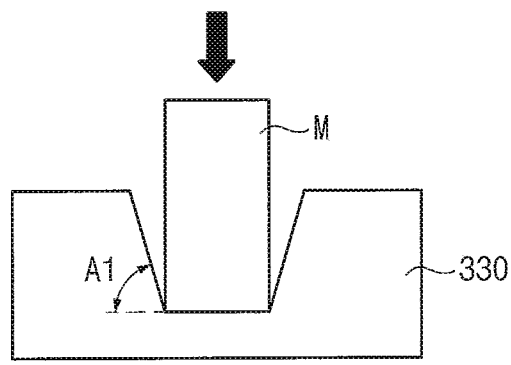
FIG. 14A and FIG. 14B are schematic views illustrating operations of the flexible supporting part of FIG. 13.
Figure 14B:
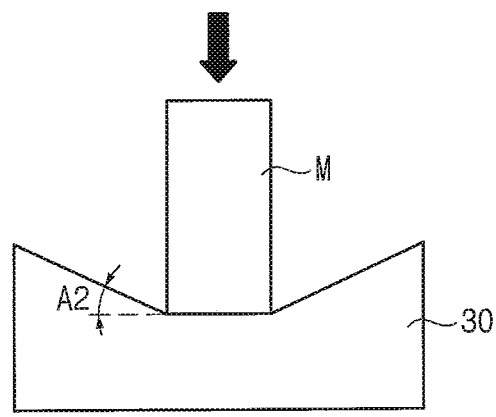

FIG. 13 is a perspective view illustrating a flexible supporting part of FIG. 9. FIG. 14A and FIG. 14B are schematic views illustrating operations of the flexible supporting part of FIG. 13. FIG. 14A shows a transform of the flexible supporting part according to the present example embodiment and FIG. 14B shows a transform of the conventional sponge.

Referring to FIG. 13, the flexible supporting part 330 may have a honeybee structure having a plurality of pores 331. The pore 331 passes through the flexible supporting part 330 and the height of the pore 331 is substantially same as the flexible supporting part 330. Each of the pores 331 has the shape and the cross-sectional area substantially same with each other. A sidewall 332 divides each of the pores 331, and the thickness of the sidewall 332 is substantially same. In the flexible supporting part 330 having the above-mentioned structure and shape, the stiffness is not formed along a specific direction, and thus the flexible supporting part 330 may have a uniform performance regardless of the transform position of the flexible supporting part 330 and the size of the target object M.

In addition, as illustrated in FIG. 14A, a surface tensile modulus of the flexible supporting part 330 is relatively larger, and thus a first angle A1 may be increased as the target object M is pressurized. Thus, the transformation of the first stiffness transform 310 is minimized to be transferred and the first stiffness transform 310 may be transformed locally or at a relatively smaller area. In addition, even though the flexible supporting part 330 is compressed, the restoring force is uniformly maintained in a constant compression deformation period or the restoring force is not rapidly increased after the constant compression deformation period, so that the flexible supporting part 330 is transformed relatively close to the shape of the target object M to increase the gripping efficiency for the target object.

In contrast, as illustrated in FIG. 14B, a surface tensile modulus of the conventional sponge 30 is relatively smaller, and thus a second angle A2 may be decreased as the target object M is pressurized. Thus, the gripping performance for the target object M may be decreased.

Referring to FIG. 9 and FIG. 10, the soft grip unit 300 may include a packing cover 360. The packing cover 360 receives and protects the first stiffness transform 310, the flexible supporting part 330 and the second stiffness transform 340.

Figure 15A:
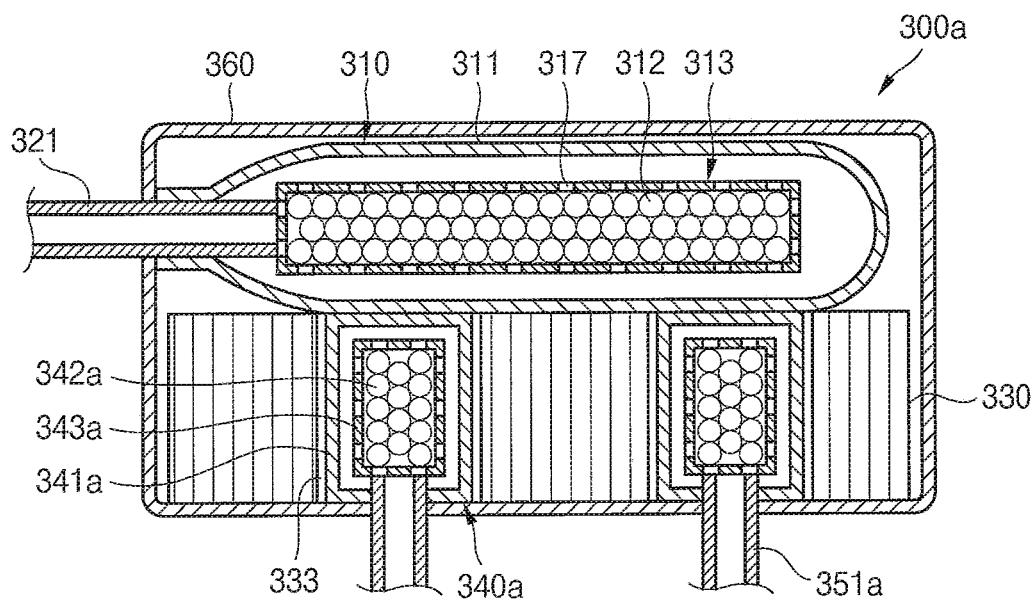
FIG. 15A and FIG. 15B are cross-sectional views illustrating a soft grip unit according to still another example embodiment of the present invention.
Figure 15B:
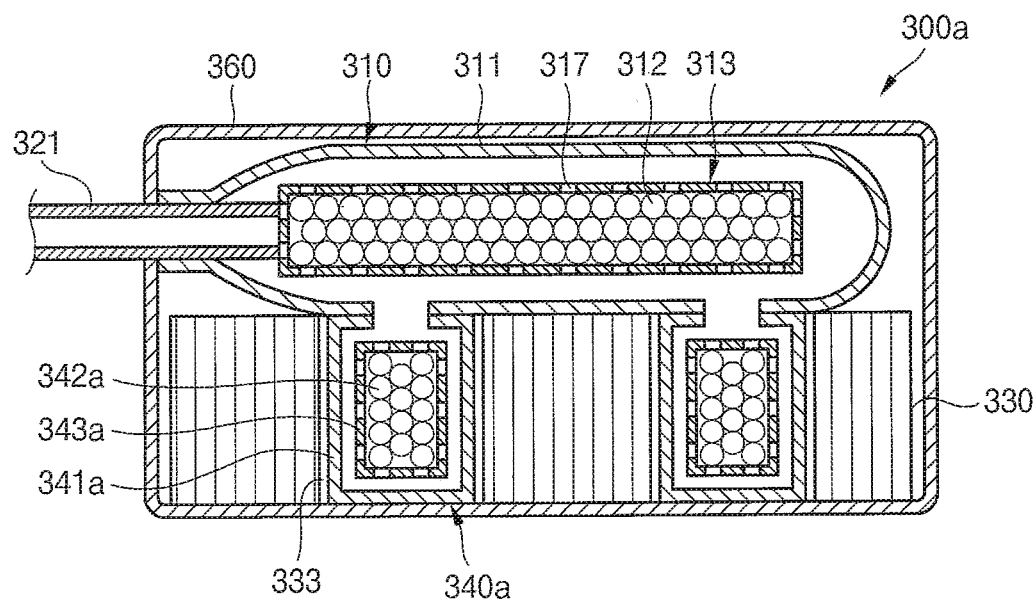
Figure 16:
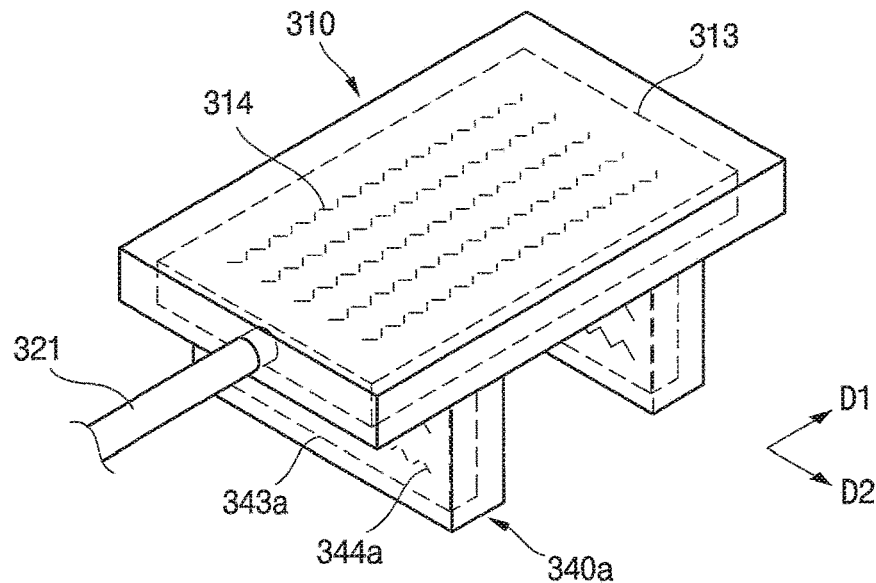
FIG. 16 is a perspective view illustrating a first stiffness transform and a second stiffness transform of FIG. 15A and FIG. 15B.

FIG. 15A and FIG. 15B are cross-sectional views illustrating a soft grip unit according to still another example embodiment of the present invention. FIG. 16 is a perspective view illustrating a first stiffness transform and a second stiffness transform of FIG. 15A and FIG. 15B.

The second stiffness transform in the present example embodiment, is differently disposed compared to the second stiffness transform in the previous example embodiment of FIG. 9.

Referring to FIGS. 15A and 16, the second stiffness transform 340a in the present example embodiment is installed in the flexible supporting part 330. Here, the flexible supporting part 330 may have an install space 333 formed along the height direction.

The second stiffness transform 340a includes a third flexible cover 341a and a third particle 342a. The third flexible cover 341a is equipped in the install space 333, and the third particle 342a is received inside of the third flexible cover 341a. The third flexible cover 341a may be same as the first flexible cover 311 explained above, and the third particle 342a may be same as the first particle 312 explained above.

The second stiffness transform 340a includes a third flexible pocket 343a, and the third flexible pocket 343a is received in the third flexible cover 341a. The third particle 342a is received in the third flexible pocket 343a.

A third suction line 351a is connected to the third flexible pocket 343a, and the fluid or air inside of the third flexible pocket 343a is removed. The third suction line 351a may be connected to the first negative pressure generator 320 or the second negative pressure generator 350 mentioned above.

The second stiffness transform 340a may be transformed with the first stiffness transform 310, and when the first transform 310 is completely transformed, the second stiffness transform 340a supports the flexible supporting part 330 to prevent the flexible supporting part 330 from being transformed. Since the flexible supporting part 330 has an elastic restoring force after the transformation, the portion of the flexible supporting part 330 adjacent to the first stiffness transform 310 is transformed corresponding to the shape of the first stiffness transform 310 but the restoring equilibrium is maintained due to the restoring force along the height direction of the flexible supporting part 330. In addition, as the shape of the flexible supporting part 330 is transformed as mentioned above, the position of the first stiffness transform 310 may be changed. However, since the second stiffness transform 340a is disposed inside of the flexible supporting part 330 along the height direction of the flexible supporting part 330, the restoring transformation of the flexible supporting part 330 is prevented, and thus the first stiffness transform 310 is prevented from being moved and the shape of the first stiffness transform 310 is stably and continuously maintained at the gripping state.

Referring to FIG. 16, a third seam 344a of the second stiffness transform 340a extends along the second direction D2, and crosses the seam 314 extending along the first direction D2.

As illustrated in FIG. 15B, an inside of the third flexible cover 341a is connected with an inside of the first flexible cover 311. Here, as the fluid or the air is removed through the first suction line 321, the fluid or the air inside of the second stiffness transform 340a is also removed, and thus the third suction line 351a may be omitted.

Figure 17:
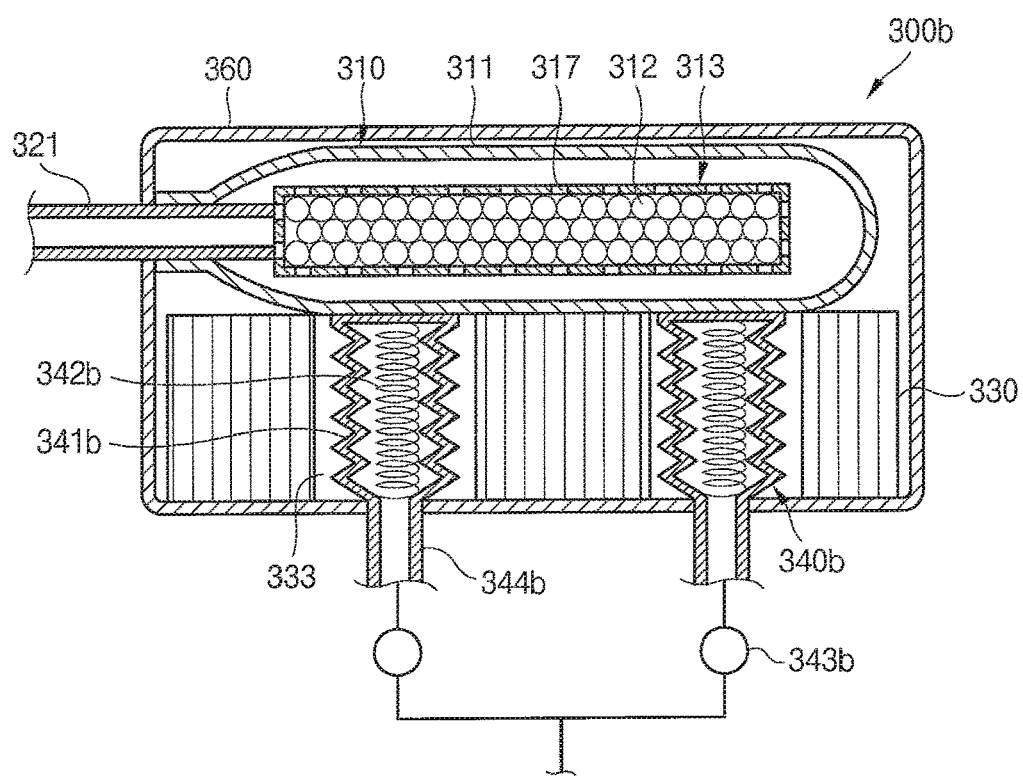
FIG. 17 is a cross-sectional view illustrating a soft grip unit according to still another example embodiment of the present invention.

FIG. 17 is a cross-sectional view illustrating a soft grip unit according to still another example embodiment of the present invention.

The soft grip unit according to the present example embodiment is substantially same as the soft grip unit in FIG. 15A except for a second stiffness transform, and thus same reference numerals are used for same elements and any repetitive explanation will be omitted.

Referring to FIG. 17, in the soft grip unit according to the present example embodiment, the second stiffness transform 340b includes a wrinkle part 341b, an elastic part 342b and a valve 343b.

The wrinkle part 341b is equipped in the install space 333 disposed in the flexible supporting part 330 along the height direction. The wrinkle part 341b is compressed and transformed as the first stiffness transform 310 is transformed.

The elastic part 342b is disposed inside of the wrinkle part 341b, and elongates the compressed wrinkle part 341b. When the transformed first stiffness transform 310 is restored into an initial shape, the wrinkle part 341b is elongated to an initial shape by the elastic part 342b.

A suction line 344b is connected to the wrinkle part 341b, and the valve 343b is combined with the suction line 344b.

The valve 343b discharges the fluid or air inside of the wrinkle part 341b during the wrinkle part 341b is compressed. In contrast, the valve 343b prevents the fluid or air from being flowed into or out of the wrinkle part 341b, so as to maintain the shape or the transformation of the wrinkle part 341b, after the compression and transformation of the wrinkle part 341b is completed.

The valve 343b may be disposed at each of the suction line 344b, or a single valve may be disposed to be connected to all of the suction lines 344b. When the single valve 343b is disposed, the lengths of the suction lines 344b connected to the valve 343b may be substantially same with each other. Thus, the amount of the fluid or air inside of each of the second stiffness transforms 340b may be maintained to be substantially same, and each of the second stiffness transforms 340b may be transformed with the same velocity.

Figure 18:
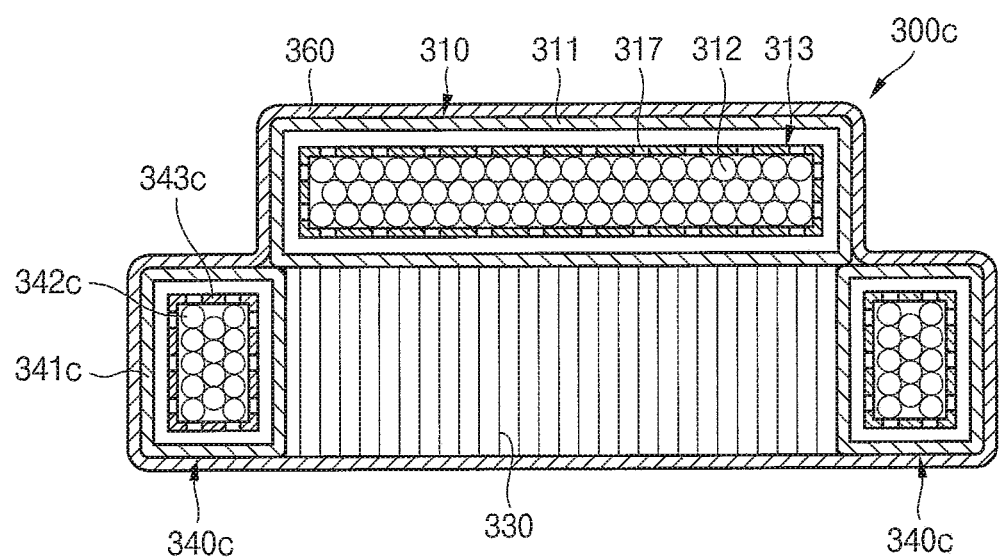
FIG. 18 is a cross-sectional view illustrating a soft grip unit according to still another example embodiment of the present invention.

FIG. 18 is a cross-sectional view illustrating a soft grip unit according to still another example embodiment of the present invention.

The soft grip unit according to the present example embodiment is substantially same as the soft grip unit in FIG. 9 except for a second stiffness transform, and thus same reference numerals are used for same elements and any repetitive explanation will be omitted.

Referring to FIG. 18, in the present example embodiment, the second stiffness transform 340c includes a fourth flexible cover 341c and a fourth particle 342c.

The fourth flexible cover 341c encloses a side surface of the flexible supporting part 330. In FIG. 18, the second stiffness transform 340c is disposed at a left side and a right side of the flexible supporting part 330, but the second stiffness transform 340c is disposed at a front side and a rear side of the flexible supporting part 330, too. The fourth flexible cover 341c encloses all side surfaces of the flexible supporting part 330, and the second stiffness transform 340c is connected to the additional negative pressure generator.

The second stiffness transform 340c is transformed with the first stiffness transform 310, and thus when the first stiffness transform 310 is completely transformed, the second stiffness transform 340c constrains the flexible supporting part 330 not to be transformed. In the present example embodiment, the second stiffness transform 340c may have a benefit for the soft grip unit 300 to grip a relatively small object at a side of the soft grip unit 300.

The fourth flexible cover 341c, the fourth flexible pocket 343c and the fourth particle 342c of the second stiffness transform 340c are substantially same as the first flexible cover 311, the first flexible pocket 313 and the first particle 312, respectively.

In addition, the fourth flexible cover 341c may be connected to the first flexible cover 311, and here, the second stiffness transform 340c may be connected to the first negative pressure generator 320 mentioned above.

Figure 19:
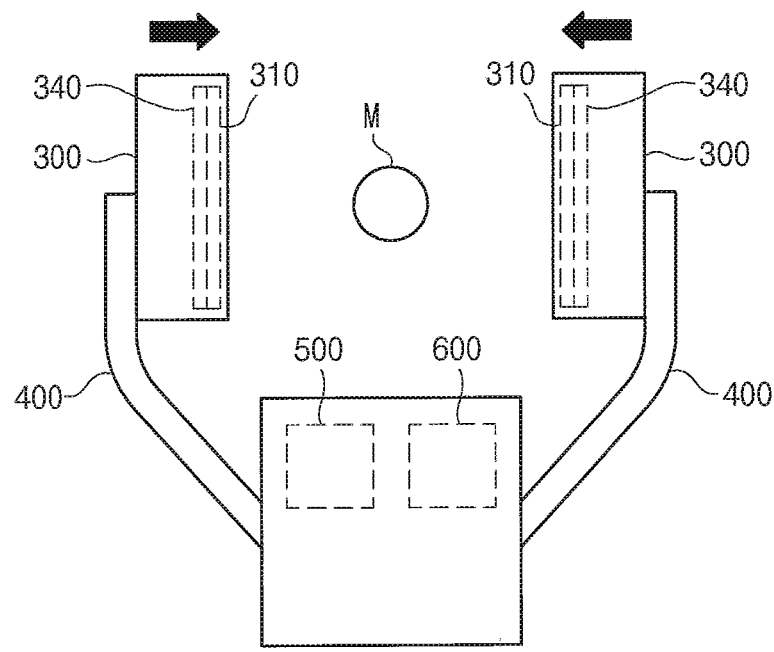
FIG. 19 is a schematic view illustrating a grip device having the soft grip unit of FIG. 9.

FIG. 19 is a schematic view illustrating a grip device having the soft grip unit of FIG. 9.

Referring to FIG. 19, the grip device includes a soft grip unit 300, an arm 400, a power supplier 500 and a control 600. Hereinafter, the soft grip unit 300 is the soft grip unit explained referring to FIG. 9, for the convenience of the explanation, but not limited thereto. Thus, the soft grip unit 300 may be one of the soft grip units explained referring to FIG. 1, FIG. 6, FIG. 15A, FIG. 15B, FIG. 17 and FIG. 18.

Thus, any further explanation on the soft grip unit 300 is omitted.

The arm 400 may be a pair, and the soft grip unit 300 is combined with each end of the pair of arms 400. The arm 400 moves the first stiffness transform 310 toward or away from the target object M.

The power supplier 500 supplies the power to the arm 400.

The controller 600 controls the operation of the arm 400, and controls the gripping of the target object M. For example, the controller 600 removes the fluid or air inside of the first and second stiffness transforms 310 and 340, after the first and second stiffness transforms 310 and 340 are transformed for gripping the target object M.

When the soft grip unit 300 sufficiently pressurizes the target object M, the controller 600 stops the transmission of the power of the power supplier 500, to control the arm 400 to stop the gripping operation. Thus, the stiffness of each of the first and second stiffness transforms 310 and 340 is changed to grip the target object M.

Figure 20:
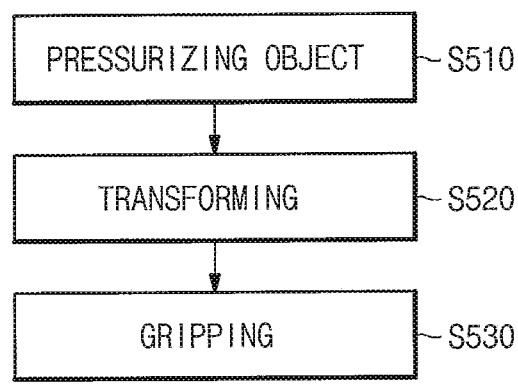
FIG. 20 is a flow chart showing a driving method of the grip device of FIG. 20.

FIG. 20 is a flow chart showing a driving method of the grip device of FIG. 20.

Referring to FIG. 20, the driving method of the grip device includes pressing the target object S510, transforming S520, and gripping S530.

In the pressing the target object S510, the arm is operated for at least one pair of first stiffness transforms to pressurize the target object.

In the transforming S520, due to the target object, the first stiffness transform, the flexible supporting part and the second stiffness transform are transformed.

In the gripping S530, the fluid or the air inside of each of the first and second stiffness transforms is removed, so that the stiffness of each of the first and second stiffness transforms is changed to grip the target object.

Figure 21A:
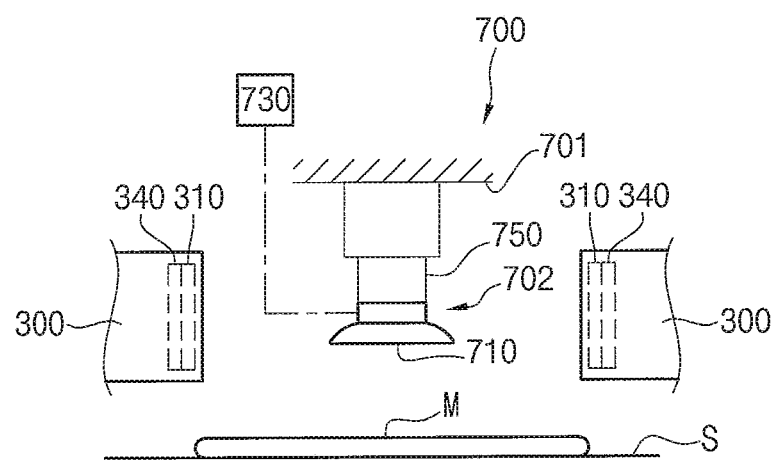
FIG. 21A and FIG. 21B are schematic view illustrating a gripping state of a grip device according to still another example embodiment of the present invention.
Figure 21B:
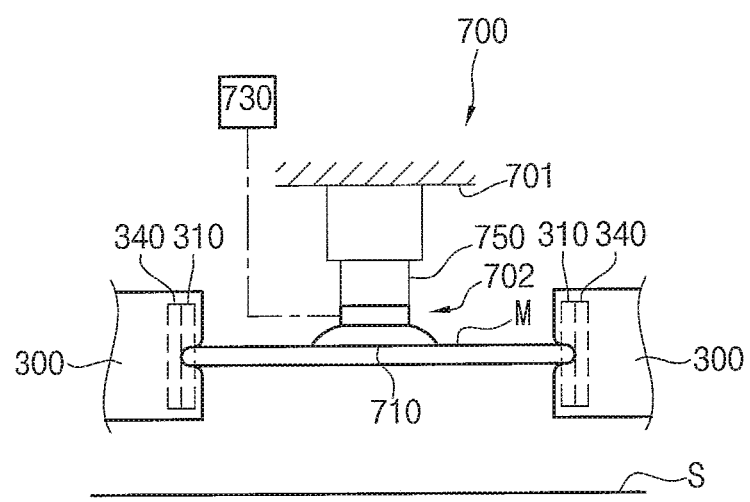

FIG. 21A and FIG. 21B are schematic view illustrating a gripping state of a grip device according to still another example embodiment of the present invention.

In the present example embodiment, the soft grip unit 300 of FIG. 9 is illustrated as a soft grip unit included in the grip device, but the soft grip unit of the grip device according to the present example embodiment may be one of the soft grip units explained above referring to FIG. 1, FIG. 6, FIG. 15A, FIG. 15B, FIG. 17 and FIG. 18.

Referring to FIG. 21A and FIG. 21B, the grip device 700 includes a frame 701, a holding unit 702 and at least one pair of soft grip units 300.

The frame 701 supports and fixes the holding unit 702 and elements of the soft grip unit 300.

The holding unit 702 is connected to the frame 701, and the holding unit 702 is disposed over the target object M which is disposed on a stage S. The holding unit 702 holds the target object M on the stage S, and moves the target object M from the stage S to an upper direction.

For example, the target object M may have a plate shape such as a thin film, a thin layer, a substrate and so on, but not limited thereto.

The holding unit 702 holds an upper surface of the target object M on the stage S, and as illustrated in FIG. 21B, the holding unit 702 may move the target object M up and down from the stage S.

The holding unit 702 includes an attaching part 710, a negative pressure generator 730 and a moving part 750.

The attaching part 710 includes a flexible pad and includes a flexible material. The attaching part 710 may have a shape like a thin sheet, a cone, a cup and so on. The flexible pad may block the air to be penetrated.

An attaching opening may be formed at a side of the flexible pad to be tightly attached to the target object M. After the attaching opening is tightly attached to the target object M, the inner space of the flexible pad may be blocked. The inner space of the flexible pad is connected to the suction line of the negative pressure generator 730.

The negative pressure generator 730 is connected to the attaching part 710. The negative pressure generator 730 includes the suction line, and the suction line is connected to the inner space of the attaching part 710. The negative pressure generator 730 removes the air inside of the attaching part 710 through the suction line.

The negative pressure generator 730 removes the air inside of the attaching part 710, and then the target object M is tightly attached to the attaching surface of the attaching part 710. For example, the target object M may be attached to the attaching opening of the flexible pad.

The moving part 750 connects the frame 701 to the attaching part 710. The moving part 750 moves the attaching part 710 toward or away from the stage S. That is, the moving part 710 moves the target object M attached to the attaching part 710 up and down from the stage S.

The target object M attached to the attaching part 710 moves up and down within a predetermined height.

At least one pair of soft grip units 300 is disposed to position the holding unit 702 therebetween. The pair of the soft grip units 300 is disposed to face each other, and the holding unit 702 is disposed between the pair of the soft grip units 300.

Alternatively, two pairs of soft grip units 300 may be disposed to face each other, which means that four soft grip units 300 may be disposed with an angle of 90°. Here, the holding unit 702 may be disposed at a center of the soft grip units 300.

After the target object M is lifted by the holding unit 702 by a predetermined height, the soft grip units 300 facing each other approach the target object M, and then the target object M is gripped by the soft grip units 300, as illustrated in FIG. 21B.

Figure 22:
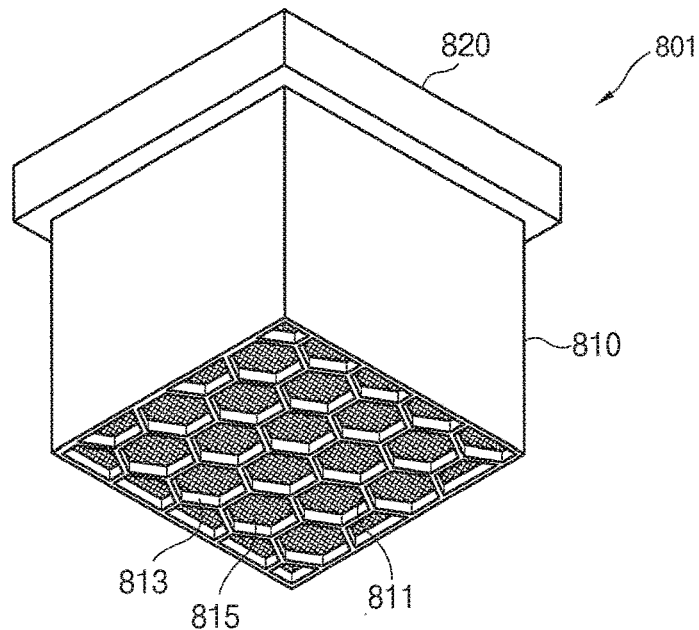
FIG. 22 is a perspective view illustrating a holding unit of a grip device according to still another example embodiment of the present invention.
Figure 23:
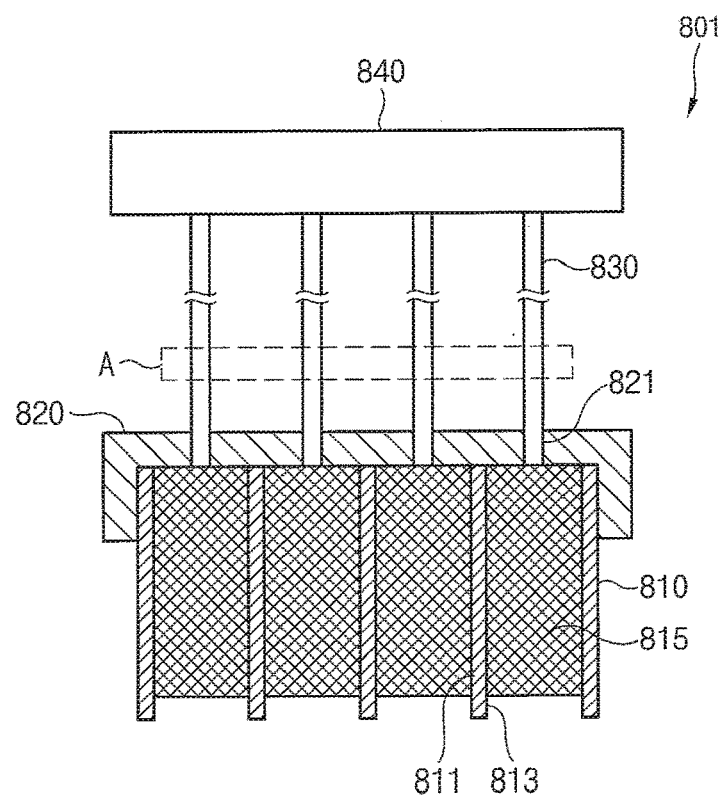
FIG. 23 is a cross-sectional view illustrating the holding unit of FIG. 22.

FIG. 22 is a perspective view illustrating a holding unit of a grip device according to still another example embodiment of the present invention. FIG. 23 is a cross-sectional view illustrating the holding unit of FIG. 22.

The grip device according to the present example embodiment is substantially same as the grip device explained referring to FIG. 21A and FIG. 21B except for a holding unit 801, and thus same reference numerals are used for same elements and any repetitive explanation will be omitted.

Referring to FIG. 22 and FIG. 23, in the grip device according to the present example embodiment, the holding unit 801 includes a suction pad 810, a flexible supporting part 815, a fixing cap 820, a suction force generator 840 and a connecting line 830.

The suction pad 810 includes a sidewall 811, and a plurality of suction cells 813 divided by the sidewall 811.

The sidewall 811 may include a flexible material, and the suction cells 813 pass through the suction pad 810. Both ends of the suction cells 813 are opened.

A suction force is provided into an inner space of the suction cell 813. The target object makes contact with a first end of the suction pad 810, and the target object is attached to the suction pad 810 when the suction force is provided from a second end of the suction pad 810.

The sidewall 811 includes a material blocking an air from being penetrated. For example, the sidewall 810 may include a flexible polymer. Thus, the air provided into one of the suction cells does not penetrate the sidewall 811 and is prevented from being provided to adjacent suction cells.

The thickness of each of the sidewalls 811 is substantially same. Each of the suction cells 813 has a cross-sectional shape of a polygon such as a triangle, a rectangular, a hexagon and so on, and the shape and the size of each of the suction cells 813 are substantially same. For example, the suction pad 810 may have a honeycomb structure.

Accordingly, the suction cells 813 is divided by the sidewall 811, and thus an empty space between the suction cells 813 may be decreased and the attaching area may be increased. Thus, the attaching may be performed more efficiently.

The flexible supporting part 815 is filled in the inner space of the suction cell 813. Since the suction force is provided from the first end of the suction cell 813 to the second end of the suction cell 813, the target object is attached to the first end of the suction cell 813 by the suction force. Here, as the target object is attached, the first end of the suction cell 813 is pressurized and transformed by the target object. When the surface of the target object is irregular, a portion of the first end of the suction cell 813 spaced apart from the surface of the target object may be disposed inside of the inner space of the suction cell 813 due to the suction force. Thus, the flexible supporting part 815 supports the suction cell 813 inside of the suction cell 813, to prevent the portion of the first end of the suction cell 813 from being disposed inside of the inner space of the suction cell 813.

Figure 24A:
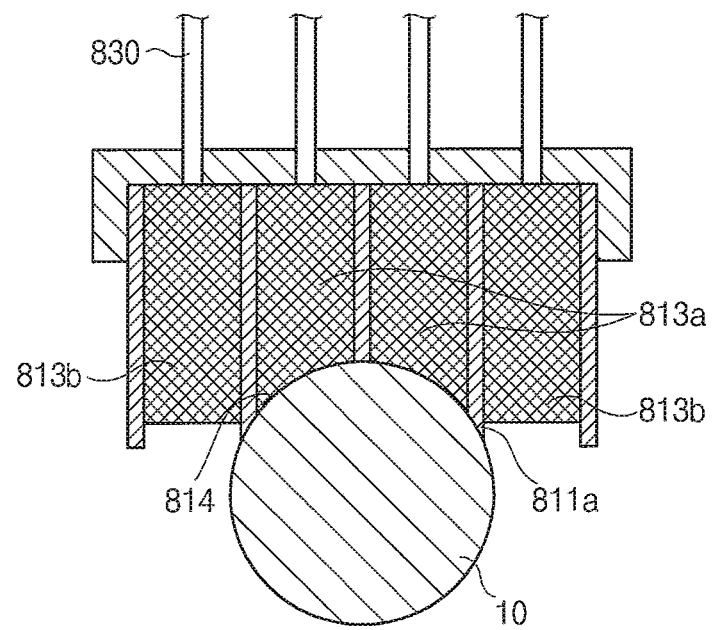
FIG. 24A is a schematic view illustrating a gripping state using the holding unit of FIG. 22.

The flexible supporting part 815 may be filled inside of the suction cell 813, but the first end of the suction cell 813 may have a space in which the flexible supporting part 815 is not filled. Thus, the first end 811a of the sidewall 811 may not be supported by the flexible supporting part 815. The first end 811a of the sidewall 811 is tightly attached to the surface of the target object and is functioned as a suction cup to block the suction cell 813. Here, if the first end 811a of the sidewall 811 is not supported by the flexible supporting part 815, the transformation of the sidewall 811 is not limited and thus the sidewall 811 may be attached to the surface of the target object more effectively. A length of the first end 811a of the sidewall 811 not supported by the flexible supporting part 815 is determined such that the suction cell 813 is not blocked or closed even though the first end 811a of the sidewall 811 is disposed inside of the inner space of the suction cell 813. For example, if the suction cell 813 has a circular cross-sectional shape, the length of the first end 811a of the sidewall 811 not supported by the flexible supporting part 815 may be less than a radius of the suction cell 813, as illustrated in FIG. 24A.

The flexible supporting part 815 includes a pore, so that an external air is provided into the suction cell 813 as the suction force is provided. For example, the flexible supporting part 815 may be a sponge.

The fixing cap 820 is connected to the second end of the suction pad 810. The fixing cap 820 includes through holes 821 respectively connected to the suction cells 813.

The suction force generator 840 generates the suction force.

The connecting line 830 connects the suction force generator 840 with the fixing cap 820 to guide the suction force generated by the suction force generator 840 into each of the suction cells 813 of the suction pad 810.

In the present example embodiment, the connecting line 830 may be a plural. A first end of the connecting line 830 is connected to the suction force generator 840, and a second end of the connecting line 830 is connected to each of the through holes 821. The suction force from the suction force generator 840 is uniformly provided to each of the suction cells 813 through the connecting line 830.

Although not shown in the figure, the holding unit 801 may include a check valve at a portion A in FIG. 23. The check valve may be disposed at the connecting line 830, and may control an opening or a closing of each of the connecting lines 830.

The connecting lines 830 are respectively connected to the suction cells 813, and each of the connecting lines 830 is independently controlled. Thus, the suction force provided to each of the suction cells 813 is also controlled independently.

Figure 24B:
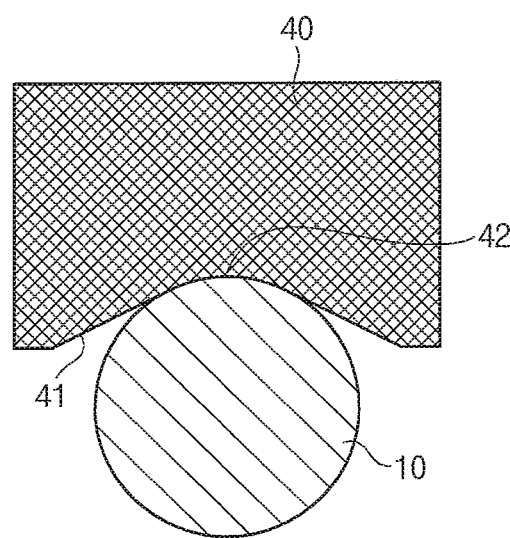
FIG. 24B is a schematic view illustrating a gripping state in the conventional grip device.

FIG. 24A is a schematic view illustrating a gripping state using the holding unit of FIG. 22, and FIG. 24B is a schematic view illustrating a gripping state in the conventional grip device.

Referring to FIG. 24A, when the target object 80 is attached to the first end of the suction pad 810, the first end of the suction pad 810 is pressurized by the target object 80.

In the present example embodiment, the suction pad 810 has the suction cell 813 divided by the sidewall 811, the suction cell 813a making contact with the target object 80 is pressurized and transformed by the target object 80, but remaining suction cells 813b are not transformed. In addition, most of portions 814 pushed by the target object 80 makes contact with the surface of the target object 80.

In contrast, referring to FIG. 24B, in the conventional grip unit 40 having the sponge shape, when the grip unit 40 is pressurized by the target object 80, a surface 41 of the grip unit 40 is entirely compressed and a portion 42 directly making contact with the target object 80 is relatively small. Thus, in the suction pad 810 according to the present example embodiment, the portion directly making contact with the target object 80 is larger compared to the conventional grip unit 40, and thus the suction force applied to the target object 80 may be more increased.

In addition, since all of the pores are connected in the conventional sponge shape grip unit 40, the suction force applied to the target object 80 may be decreased. In contrast, in the present example embodiment, the air is blocked to penetrate the sidewall 811 and thus the suction force applied to the specific suction cell 813a is only used for gripping the target object 80 attached to the specific suction cell 813a. Thus, the suction force may be applied to the target object 80 more effectively.

According to the present example embodiments, the flexible cover is supported by the flexible supporting part and an amount of the particles is reduced by forming the thickness of the flexible cover thinner, so that the pressing force on the object may be applied more effectively. Thus, the object may be easily gripped with a decreased force, and the fragile object may be gripped more easily without the damage to the object.

In addition, the transformed shape is fixed due to the gripping using the particle, so that the gripping may be stably and continuously maintained even though the object is flexible or has an atypical shape. In addition, the shape of the object or the strength for the object may not be limited.

In addition, the signal generator generates the transform completing signal when the flexible cover is transformed to reach the predetermined compression distance, and the gripping operation may be stopped when the signal is generated, so that the object may be prevented from being damaged due to an additional unnecessary gripping force.

In addition, the second stiffness transform is added to the first stiffness transform, to prevent the first stiffness transform from being additionally transformed or moved along the second direction. Here, the first stiffness transform has relatively larger stiffness along the first direction compared to the stiffness along other directions, and the second stiffness transform has relatively larger stiffness along the second direction compared to the stiffness along other direction. Thus, the object may be stably and continuously gripped.

In addition, the object may be moved by the holding unit, so as for the soft grip unit to grip the object, so that the gripping may be automatically performed for the object regardless of the position of the object.

Here, the holding unit is divided into the plurality of spaces with the plurality of suction cells, so that the space between the suction cells is decreased and the entire suction area is increased, to enhance the efficiency of the suction.

Further, when the suction cell contacting with the object is transformed by the pressure of the shape of the object, a portion of the suction cell pressed by the object is mostly contacted with the surface of the object and thus the contact area between the suction cell and the object may be increased. Thus, the suction force applied to the object may be increased. In addition, due to the porous flexible supporting material filled in the suction cell, each suction cell provides the suction force to the object more efficiently.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A soft grip unit comprising:
a flexible cover having a gripping surface on which a target object is attached and a reference surface coupled with the gripping surface, to form a receiving space inside of the flexible cover;
a particle received by the receiving space, and transformed corresponding to a shape of the target object;
a negative pressure generator connected to the flexible cover, wherein the negative pressure generator absorbs an air of the receiving space to contract the flexible cover so that the particle transformed corresponding to the shape of the target object is pressurized so as for the target object to be gripped by the flexible cover;
a flexible supporting part tightly attached to the reference surface, and transformed at the same time when the flexible cover is pressurized and transformed by the target object, to support the flexible cover; and
a signal generator generating a transform completing signal when the flexible cover is transformed to reach a predetermined compression distance,
wherein the signal generator comprises:
a pressing block disposed inside of a through hole formed at the flexible supporting part; and
a flexible electrode formed at a surface of the flexible supporting part and generating the transform completing signal.

2. The soft grip unit of claim 1, further comprising:
a flexible pocket received in the receiving space, having a pore having the size smaller than the particle, and receiving the particle inside of the flexible pocket.

3. The soft grip unit of claim 2, wherein the flexible pocket has a plurality of dividing parts, and the particle is uniformly distributed and received by each of the dividing parts.

4. The soft grip unit of claim 2, wherein the negative pressure generator has a suction line extending into an inside of the receiving space and inhaling the air of the receiving space,
wherein an end of the suction line is connected to the flexile pocket.

5. The soft grip unit of claim 1, wherein the flexible electrode generates the transform completing signal when the flexible cover is transformed to reach the predetermined compression distance.

6. The soft grip unit of claim 1, wherein the pressing block is spaced apart from the flexible electrode at an initial state when the flexible supporting part is not compressed and transformed.

7. A grip device comprising:
an arm, wherein the soft grip unit as claimed in claim 1 is combined with the arm and the arm operates the soft grip unit to reach the target object or to be far away from the target object;
a power supplier configured to supply a power to the arm; and
a controller configured to control the arm to change a stiffness of the soft grip unit for gripping the target object when the soft grip unit is transformed by the target object.

8. The grip device of claim 7, further comprising:
a holding unit configured to be operated between at least one pair of soft grip units, and holding the target object to be positioned between the pair of soft grip units.

9. The grip device of claim 8, wherein the holding unit has a suction pad and the suction pad has a plurality of suction cells respectively forming an inner space divided by a sidewall,
wherein the sidewall blocks an air flow,
wherein a suction power is provided into the inner space of each of the suction cells to grip the target object.

10. The grip device of claim 9, wherein the holding unit has a porous flexible supporting material filled in the inner space of each of the suction cells.

11. A soft grip unit comprising:
a first stiffness transform having a first flexible cover and a first particle received in the first flexible cover, wherein after the first stiffness transform is transformed by an external force, stiffness of the first stiffness transform is changed as a fluid inside of the first flexible cover is removed, and the stiffness along a first direction is larger than that along a direction different from the first direction;
a flexible supporting part tightly attached to a surface of the first stiffness transform, and compressed and transformed at the same time as the first stiffness transform is transformed to support the first stiffness transform; and
a second stiffness transform disposed adjacent to the first stiffness transform, wherein after the second stiffness transform is transformed by the external force, the stiffness of the second stiffness transform is changed as the fluid inside thereof is removed, and a stiffness along a second direction crossing the first direction is larger than that along a direction different from the second direction so that the first stiffness transform is prevented from being moved or transformed additionally along the second direction.

12. The soft grip unit of claim 11, wherein the first stiffness transform has a first flexible pocket disposed inside of the first flexible cover and receiving the first particle,
wherein the first flexible pocket has a plurality of first dividing parts which is divided by a seam and receives the first particle uniformly, and a stitch of the seam is sewed by a zigzag pattern along the first direction so as for the first flexible pocket to elongate and contract along the first direction.

13. The soft grip unit of claim 11, wherein the second stiffness transform has a second flexible cover disposed opposite to the first stiffness transform and a second particle received inside of the second flexible cover,
wherein the stiffness of the second stiffness transform is changed as a fluid of the second flexible cover is removed, and a stiffness along the second direction is larger than that along a direction different from the second direction.

14. The soft grip unit of claim 13, wherein the second stiffness transform has a second flexible pocket disposed inside of the second flexible cover and receiving the second particle,
- wherein the second flexible pocket has a plurality of second dividing parts which is divided by a seam and receives the second particle uniformly, and a stitch of the seam is sewed by a zigzag pattern along the second direction so as for the second flexible pocket to expand and contract along the second direction.

15. The soft grip unit of claim 11, wherein an install space is formed in the flexible supporting part along a height direction,
- wherein the second stiffness transform has a third flexible cover disposed in the install space and a third particle received inside of the third flexible cover,
- wherein the second stiffness transform supports the flexible supporting part to prevent the flexible supporting part from being transformed, when the second stiffness transform is transformed with the first stiffness transform and the transformation of the first stiffness transform is completed.

16. The soft grip unit of claim 11, wherein an install space is formed in the flexible supporting part along a height direction,
- wherein the second stiffness transform has a wrinkle part disposed in the install space and an elastic part disposed inside of the wrinkle part, the wrinkle part being compressed and transformed as the first stiffness transform is transformed, the elastic part elongating the compressed and transformed winkle part,
- wherein the second stiffness transform further has a valve, the valve removing a fluid inside of the wrinkle part when the wrinkle part is compressed and transformed and preventing the fluid from being flowed into the wrinkle part when the compression and the transformation of the wrinkle part is completed.

17. The soft grip unit of claim 11, wherein the second stiffness transform has a fourth flexible cover covering a side surface of the flexible supporting part, and a fourth particle received inside of the fourth flexible cover,
- wherein the second stiffness transform constrains the flexible supporting part to prevent the flexible supporting part from being transformed when the second stiffness transform is transformed with the first stiffness transform and the transformation of the first stiffness transform is completed.

18. The soft grip unit of claim 11, wherein the flexible supporting part has a honeycomb structure having a plurality of pores and a plurality of sidewalls respectively dividing the pores with substantially same thickness,
- wherein each of the pores passes through the flexible supporting part along a height direction, and a shape and a cross-sectional area of each of the pores are substantially same.

19. The soft grip unit of claim 11, further comprising:
- a packing cover receiving the first stiffness transform, the flexible supporting part and the second stiffness transform.

* * * * *